(12) United States Patent
Suto et al.

(10) Patent No.: US 8,599,447 B2
(45) Date of Patent: Dec. 3, 2013

(54) ILLUMINATING APPARATUS, IMAGE READING APPARATUS, AND IMAGE FORMING APPARATUS

(75) Inventors: Yasuhiro Suto, Osaka (JP); Tomohiko Okada, Osaka (JP); Shohichi Fukutome, Osaka (JP); Hisashi Yamanaka, Osaka (JP); Kenji Nakanishi, Osaka (JP); Yoshihisa Yamada, Osaka (JP); Mitsuharu Yoshimoto, Osaka (JP); Eiji Kurimoto, Osaka (JP); Keiji Sakai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 207 days.

(21) Appl. No.: 13/144,874

(22) PCT Filed: Dec. 18, 2009

(86) PCT No.: PCT/JP2009/071094
§ 371 (c)(1),
(2), (4) Date: Jul. 15, 2011

(87) PCT Pub. No.: WO2010/084679
PCT Pub. Date: Jul. 29, 2010

(65) Prior Publication Data
US 2011/0273752 A1    Nov. 10, 2011

(30) Foreign Application Priority Data
Jan. 21, 2009  (JP) ................................ 2009-011064

(51) Int. Cl.
H04N 1/04        (2006.01)
(52) U.S. Cl.
USPC ........................................................ 358/475

(58) Field of Classification Search
USPC .......................... 358/474, 475, 509, 501, 505
See application file for complete search history.

(56) References Cited

U.S. PATENT DOCUMENTS 5,117,100 A * 5/1992 Yoshida et al. ............... 250/221
5,608,716 A * 3/1997 Koyama et al. ............ 369/275.1
(Continued)

FOREIGN PATENT DOCUMENTS

| JP | 56-153879 | 11/1981 |
| JP | 05-014615 | 1/1993 |

(Continued)

OTHER PUBLICATIONS

International Search Report for corresponding International Application No. PCT/JP2009/071094 mailed Feb. 2, 2010.

*Primary Examiner* — Negussie Worku
(74) *Attorney, Agent, or Firm* — Renner, Otto, Boisselle & Sklar, LLP

(57) ABSTRACT

In a light source unit (210) serving as an embodiment of an illuminating apparatus, when P is a light-emitting element pitch [mm], and H is an optical axis distance [mm] between light-emitting elements (212) and an original (G), and when, in an illuminance cycle (T) representing repetition of bright and dark areas in a main scanning direction (X) on a light-irradiated face (Gs) of the original (G) caused by the light-emitting elements (212), the light-emitting element pitch (P) and the optical axis distance (H) are set such that unevenness [%] (M) (=(L1−L2)/L3 [%]) obtained by dividing a value obtained by subtracting a minimum illuminance value (L2) from a maximum illuminance value (L1) by an average illuminance value (L3) and an inter-unevenness distance [mm] (N) which is a half cycle of the illuminance cycle (T) satisfy the relation M≤N/2−5.5, and more preferably, M≤N/2−7.5.

12 Claims, 17 Drawing Sheets

(56) References Cited

U.S. PATENT DOCUMENTS

| | | | |
|---|---|---|---|
| 5,638,211 A * | 6/1997 | Shiraishi | 359/559 |
| 6,476,369 B1 * | 11/2002 | Matsumoto | 250/208.1 |
| 6,809,717 B2 * | 10/2004 | Asao et al. | 345/102 |
| 6,927,836 B2 * | 8/2005 | Nishinaga | 355/53 |
| 7,217,573 B1 * | 5/2007 | Oshida et al. | 436/94 |
| 7,233,562 B2 * | 6/2007 | Itonaga | 369/112.01 |
| 7,427,974 B2 * | 9/2008 | Asao et al. | 345/89 |
| 7,826,703 B2 * | 11/2010 | Iwasaki | 385/129 |
| 7,916,612 B2 * | 3/2011 | Nagatomi et al. | 369/112.19 |
| 8,077,582 B2 * | 12/2011 | Saito et al. | 369/112.01 |
| 8,483,023 B2 * | 7/2013 | Yamasaki et al. | 369/44.11 |

FOREIGN PATENT DOCUMENTS

| | | |
|---|---|---|
| JP | 2007-214923 | 8/2007 |
| JP | 2008-118246 | 5/2008 |
| JP | 2008-172560 | 7/2008 |
| JP | 2008-172561 | 7/2008 |
| JP | 2008-197432 | 8/2008 |

* cited by examiner

FIG.3
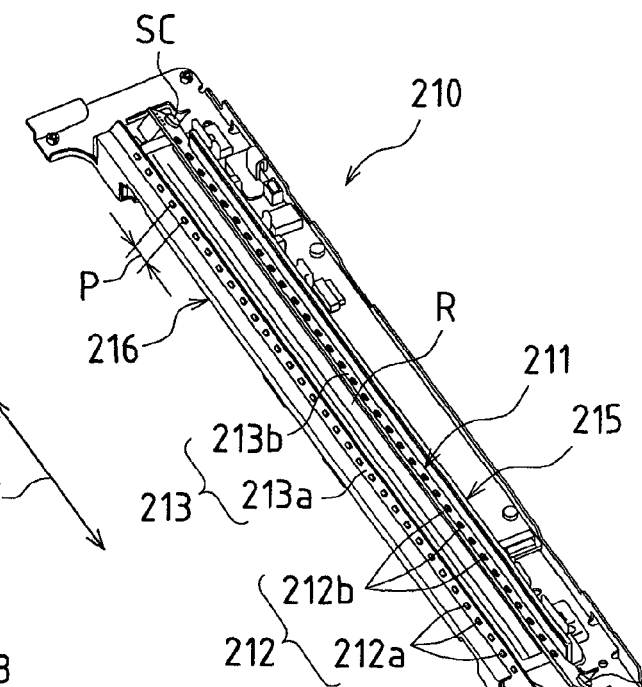
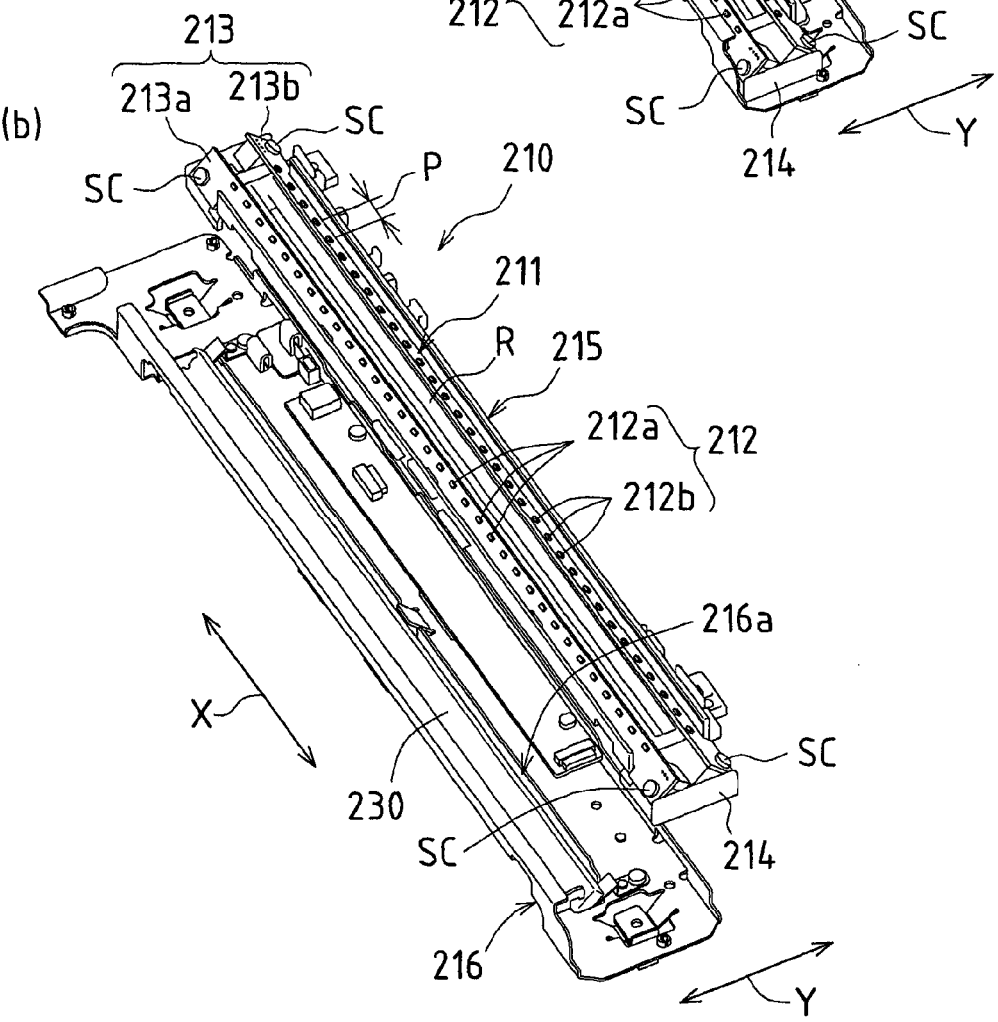

FIG.7
(a)
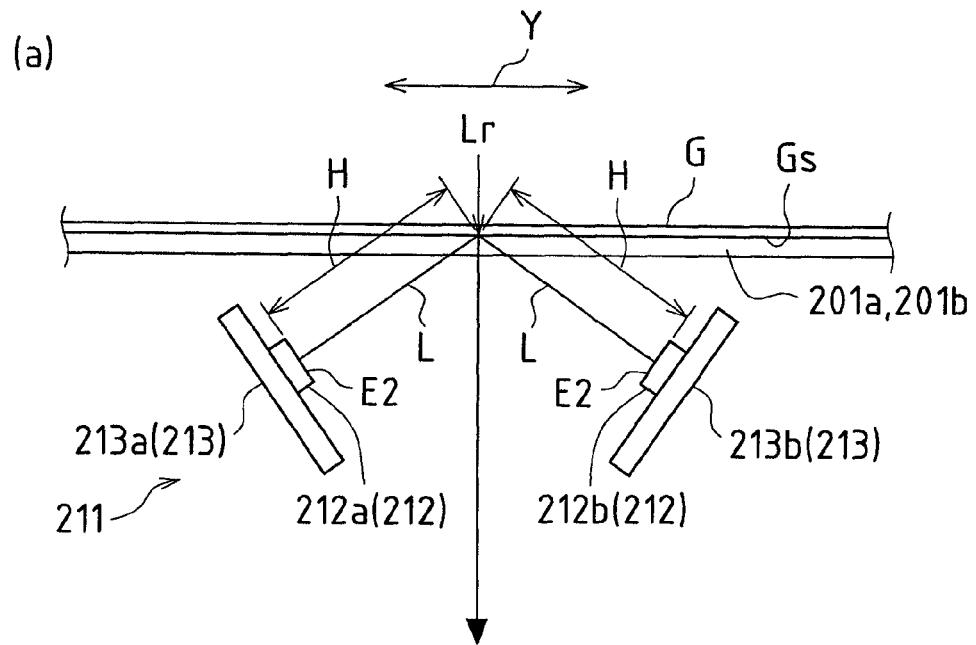
(b)
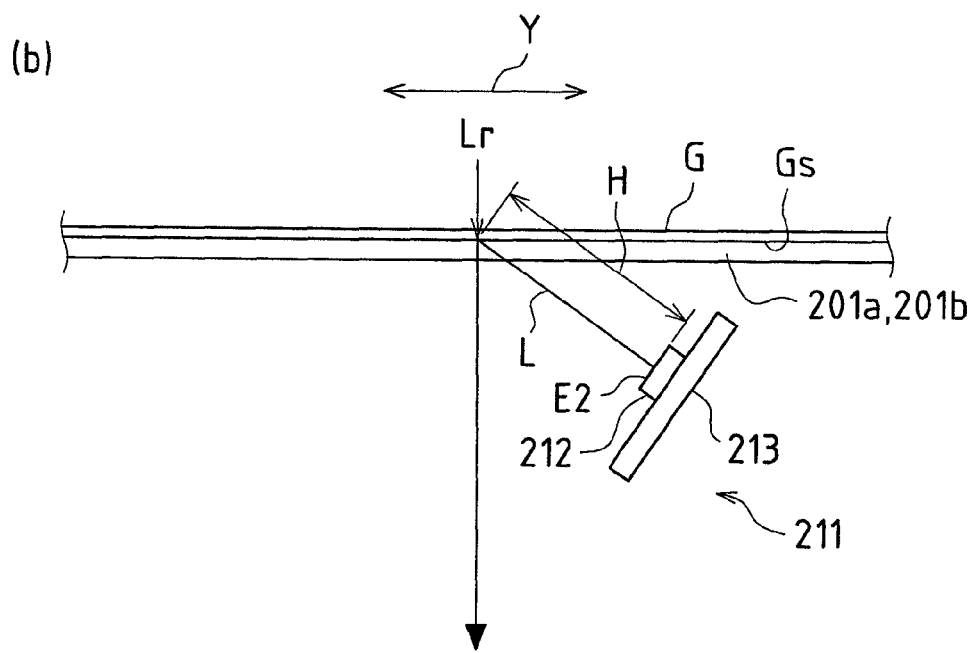

FIG.9

| Illuminance cycle [mm] | Amplitude [%] K | Inter-unevenness distance [mm] N | Unevenness [%] M | Evaluation |
|---|---|---|---|---|
| 5 | 1 | 2.5 | 2 | × |
| 10 | 1 | 5 | 2 | × |
| 20 | 1 | 10 | 2 | × |
| 30 | 1 | 15 | 2 | △ |
| 50 | 1 | 25 | 2 | ○ |
| 70 | 1 | 35 | 2 | ○ |
| 5 | 2.5 | 2.5 | 5 | × |
| 10 | 2.5 | 5 | 5 | × |
| 20 | 2.5 | 10 | 5 | × |
| 30 | 2.5 | 15 | 5 | × |
| 50 | 2.5 | 25 | 5 | ○ |
| 70 | 2.5 | 35 | 5 | ○ |
| 5 | 5 | 2.5 | 10 | × |
| 10 | 5 | 5 | 10 | × |
| 20 | 5 | 10 | 10 | × |
| 30 | 5 | 15 | 10 | × |
| 50 | 5 | 25 | 10 | × |
| 70 | 5 | 35 | 10 | ○ |
| 70 | 6 | 35 | 12 | △ |

FIG.12
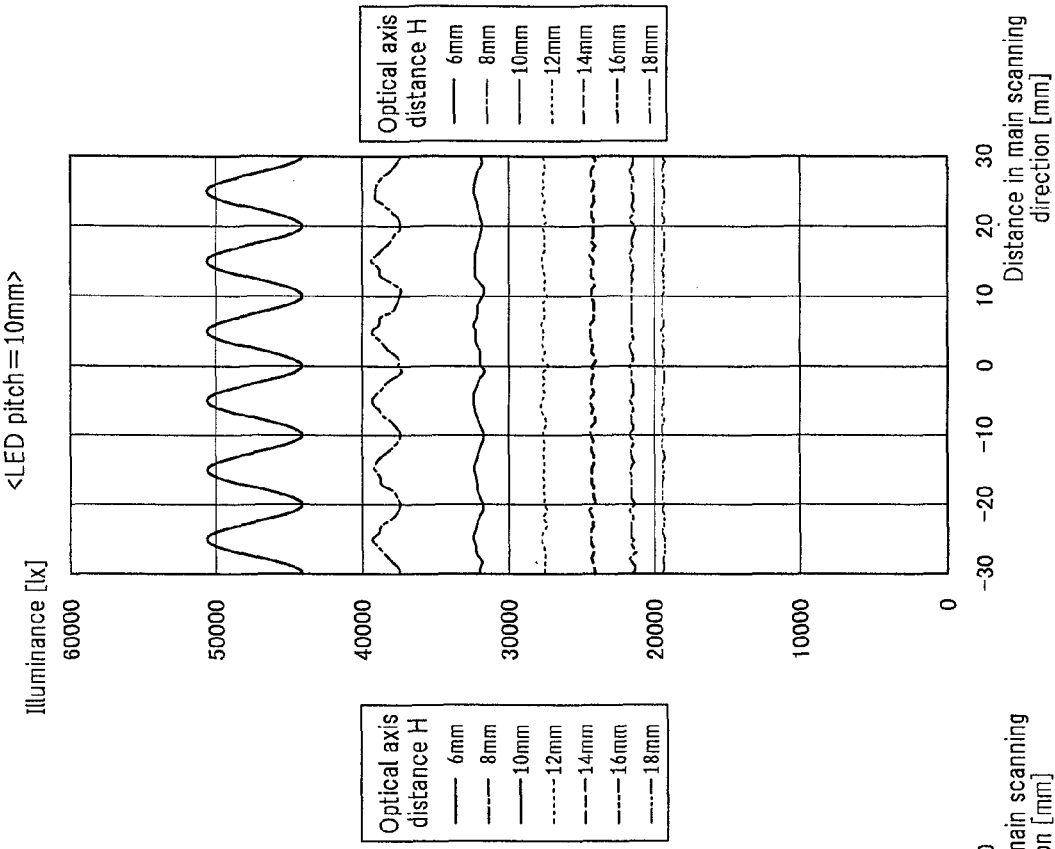
(a)
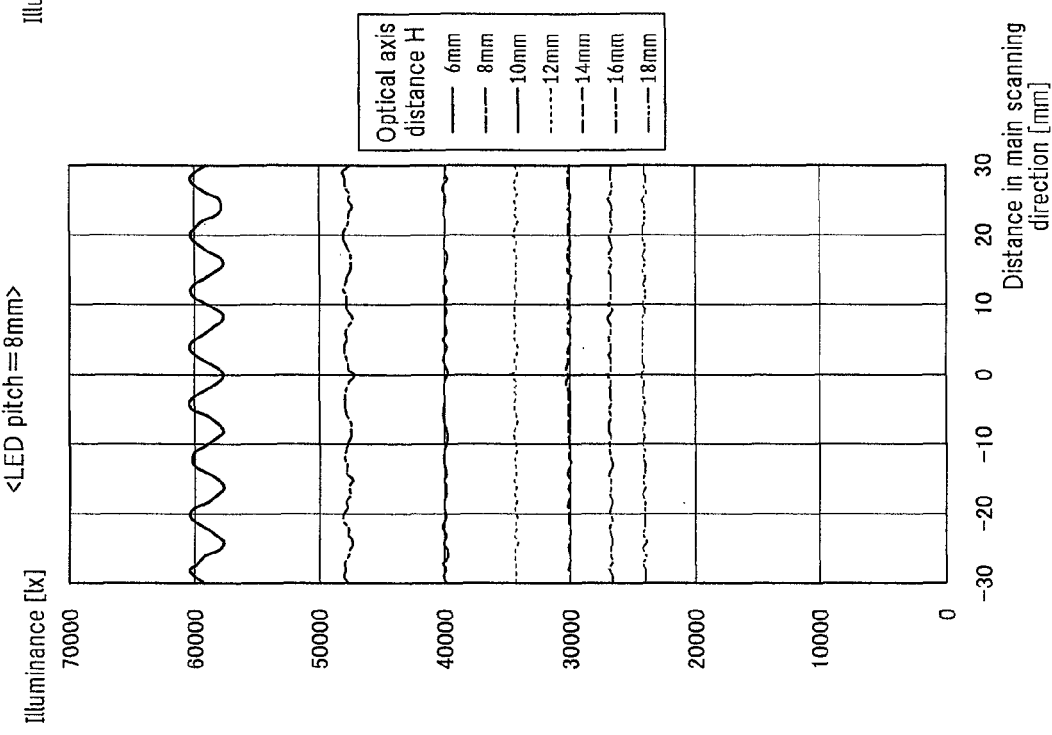
(b)

FIG.16

| Optical axis distance H (mm) | LED pitch P(mm) | | | | | | | | | | | | | | | |
|---|---|---|---|---|---|---|---|---|---|---|---|---|---|---|---|---|
| | 4 | | 5 | | 6 | | 7 | | 8 | | 9 | | 10 | | 11 | |
| | Unevenness | P/H | Unevenness | P/H | Unevenness | P/H | Unevenness | P/H | Unevenness | P/H | Unevenness | P/H | Unevenness | P/H | Unevenness | P/H |
| 4 | × | 1.00 | × | 1.25 | × | 1.50 | × | 1.75 | × | 2.00 | × | 2.25 | × | 2.50 | × | 2.75 |
| 5 | △ | 0.80 | × | 1.00 | × | 1.20 | × | 1.40 | × | 1.60 | × | 1.80 | × | 2.00 | × | 2.20 |
| 6 | ○ | 0.67 | △ | 0.83 | × | 1.00 | × | 1.17 | × | 1.33 | × | 1.50 | × | 1.67 | × | 1.83 |
| 7 | ○ | 0.57 | ○ | 0.71 | × | 0.86 | × | 1.00 | × | 1.14 | × | 1.29 | × | 1.43 | × | 1.57 |
| 8 | ○ | 0.50 | ○ | 0.63 | △ | 0.75 | × | 0.88 | × | 1.00 | × | 1.13 | × | 1.25 | × | 1.38 |
| 9 | ○ | 0.44 | ○ | 0.56 | ○ | 0.67 | △ | 0.78 | △ | 0.89 | × | 1.00 | × | 1.11 | × | 1.22 |
| 10 | ○ | 0.40 | ○ | 0.50 | ○ | 0.60 | ○ | 0.70 | △ | 0.80 | × | 0.90 | × | 1.00 | × | 1.10 |
| 11 | ○ | 0.36 | ○ | 0.45 | ○ | 0.55 | ○ | 0.64 | △ | 0.73 | △ | 0.82 | × | 0.91 | × | 1.00 |
| 12 | ○ | 0.33 | ○ | 0.42 | ○ | 0.50 | ○ | 0.58 | ○ | 0.67 | △ | 0.75 | △ | 0.83 | × | 0.92 |
| 13 | ○ | 0.31 | ○ | 0.38 | ○ | 0.46 | ○ | 0.54 | ○ | 0.62 | ○ | 0.69 | △ | 0.77 | × | 0.85 |
| 14 | ○ | 0.29 | ○ | 0.36 | ○ | 0.43 | ○ | 0.50 | ○ | 0.57 | ○ | 0.64 | ○ | 0.71 | △ | 0.79 |
| 15 | ○ | 0.27 | ○ | 0.33 | ○ | 0.40 | ○ | 0.47 | ○ | 0.53 | ○ | 0.60 | ○ | 0.67 | △ | 0.73 |
| 16 | ○ | 0.25 | ○ | 0.31 | ○ | 0.38 | ○ | 0.44 | ○ | 0.50 | ○ | 0.56 | ○ | 0.63 | ○ | 0.69 |
| 17 | ○ | 0.24 | ○ | 0.29 | ○ | 0.35 | ○ | 0.41 | ○ | 0.47 | ○ | 0.53 | ○ | 0.59 | ○ | 0.65 |
| 18 | ○ | 0.22 | ○ | 0.28 | ○ | 0.33 | ○ | 0.39 | ○ | 0.44 | ○ | 0.50 | ○ | 0.56 | ○ | 0.61 |
| 19 | ○ | 0.21 | ○ | 0.26 | ○ | 0.32 | ○ | 0.37 | ○ | 0.42 | ○ | 0.47 | ○ | 0.53 | ○ | 0.58 |
| 20 | ○ | 0.20 | ○ | 0.25 | ○ | 0.30 | ○ | 0.35 | ○ | 0.40 | ○ | 0.45 | ○ | 0.50 | ○ | 0.55 |
| 21 | ○ | 0.19 | ○ | 0.24 | ○ | 0.29 | ○ | 0.33 | ○ | 0.38 | ○ | 0.43 | ○ | 0.48 | ○ | 0.52 |
| 22 | ○ | 0.18 | ○ | 0.23 | ○ | 0.27 | ○ | 0.32 | ○ | 0.36 | ○ | 0.41 | ○ | 0.45 | ○ | 0.50 |
| 23 | ○ | 0.17 | ○ | 0.22 | ○ | 0.26 | ○ | 0.30 | ○ | 0.35 | ○ | 0.39 | ○ | 0.43 | ○ | 0.48 |
| 24 | ○ | 0.17 | ○ | 0.21 | ○ | 0.25 | ○ | 0.29 | ○ | 0.33 | ○ | 0.38 | ○ | 0.42 | ○ | 0.46 |

○: Uneven illuminance is sufficiently acceptable
△: Uneven illuminance is at acceptable limit
×: Uneven illuminance is not acceptable

FIG.17

| | | LED pitch P(mm) | | | | | | | | | | | | | | | |
|---|---|---|---|---|---|---|---|---|---|---|---|---|---|---|---|---|---|
| | | 12 | | 13 | | 14 | | 15 | | 16 | | 17 | | 18 | | 19 | |
| | | Unevenness | P/H | Unevenness | P/H | Unevenness | P/H | Unevenness | P/H | Unevenness | P/H | Unevenness | P/H | Unevenness | P/H | Unevenness | P/H |
| Optical axis distance H (mm) | 4 | × | 3.00 | × | 3.25 | × | 3.50 | × | 3.75 | × | 4.00 | × | 4.25 | × | 4.50 | × | 4.75 |
| | 5 | × | 2.40 | × | 2.60 | × | 2.80 | × | 3.00 | × | 3.20 | × | 3.40 | × | 3.60 | × | 3.80 |
| | 6 | × | 2.00 | × | 2.17 | × | 2.33 | × | 2.50 | × | 2.67 | × | 2.83 | × | 3.00 | × | 3.17 |
| | 7 | × | 1.71 | × | 1.86 | × | 2.00 | × | 2.14 | × | 2.29 | × | 2.43 | × | 2.57 | × | 2.71 |
| | 8 | × | 1.50 | × | 1.63 | × | 1.75 | × | 1.88 | × | 2.00 | × | 2.13 | × | 2.25 | × | 2.38 |
| | 9 | × | 1.33 | × | 1.44 | × | 1.56 | × | 1.67 | × | 1.78 | × | 1.89 | × | 2.00 | × | 2.11 |
| | 10 | × | 1.20 | × | 1.30 | × | 1.40 | × | 1.50 | × | 1.60 | × | 1.70 | × | 1.80 | × | 1.90 |
| | 11 | × | 1.09 | × | 1.18 | × | 1.27 | × | 1.36 | × | 1.45 | × | 1.55 | × | 1.64 | × | 1.73 |
| | 12 | × | 1.00 | × | 1.08 | × | 1.17 | × | 1.25 | × | 1.33 | × | 1.42 | × | 1.50 | × | 1.58 |
| | 13 | × | 0.92 | × | 1.00 | × | 1.08 | × | 1.15 | × | 1.23 | × | 1.31 | × | 1.38 | × | 1.46 |
| | 14 | × | 0.86 | × | 0.93 | × | 1.00 | × | 1.07 | × | 1.14 | × | 1.21 | × | 1.29 | × | 1.36 |
| | 15 | △ | 0.80 | × | 0.87 | × | 0.93 | × | 1.00 | × | 1.07 | × | 1.13 | × | 1.20 | × | 1.27 |
| | 16 | △ | 0.75 | △ | 0.81 | △ | 0.88 | × | 0.94 | × | 1.00 | × | 1.06 | × | 1.13 | × | 1.19 |
| | 17 | ○ | 0.71 | △ | 0.76 | △ | 0.82 | × | 0.88 | × | 0.94 | × | 1.00 | × | 1.06 | × | 1.12 |
| | 18 | ○ | 0.67 | ○ | 0.72 | △ | 0.78 | △ | 0.83 | × | 0.89 | × | 0.94 | × | 1.00 | × | 1.06 |
| | 19 | ○ | 0.63 | ○ | 0.68 | ○ | 0.74 | △ | 0.79 | × | 0.84 | × | 0.89 | × | 0.95 | × | 1.00 |
| | 20 | ○ | 0.60 | ○ | 0.65 | ○ | 0.70 | ○ | 0.75 | × | 0.80 | × | 0.85 | × | 0.90 | × | 0.95 |
| | 21 | ○ | 0.57 | ○ | 0.62 | ○ | 0.67 | ○ | 0.71 | △ | 0.76 | × | 0.81 | × | 0.86 | × | 0.90 |
| | 22 | ○ | 0.55 | ○ | 0.59 | ○ | 0.64 | ○ | 0.68 | △ | 0.73 | △ | 0.77 | △ | 0.82 | △ | 0.86 |
| | 23 | ○ | 0.52 | ○ | 0.57 | ○ | 0.61 | ○ | 0.65 | ○ | 0.70 | △ | 0.74 | △ | 0.78 | △ | 0.83 |
| | 24 | ○ | 0.50 | ○ | 0.54 | ○ | 0.58 | ○ | 0.63 | ○ | 0.67 | ○ | 0.71 | △ | 0.75 | △ | 0.79 |

○: Uneven illuminance is sufficiently acceptable
△: Uneven illuminance is at acceptable limit
×: Uneven illuminance is not acceptable

ILLUMINATING APPARATUS, IMAGE READING APPARATUS, AND IMAGE FORMING APPARATUS

TECHNICAL FIELD

The present invention relates to an illuminating apparatus that illuminates an original, an image reading apparatus and an image forming apparatus.

BACKGROUND ART

Generally, in image reading apparatuses provided in image forming apparatuses such as copiers, fax machines or digital multi-functional peripherals, or image reading apparatuses connected to a computer via communication means such as a network, light reflected from an original that is illuminated by an illuminating apparatus including a light source is read as the original image.

For example, a conventional image reading apparatus includes an illuminating apparatus in which a light source for illuminating an original placed on a platen glass and a first mirror are arranged, second and third mirrors, an imaging lens and an imaging element (for example, a line sensor such as a CCD (Charge Coupled Device)). Many of such image reading apparatuses are configured to read an original image by causing light reflected from the original illuminated by a light source to travel via a first mirror, a second mirror, a third mirror and then an imaging lens to form an image on an imaging element.

Also, an image reading apparatus is used as an image reading means when information of an image formed on an imaging element such as a CCD is converted to electronic signals and subjected to image processing, and transferred to an image forming portion that prints image information or to a computer (for example, personal computer) connected to a network, for example.

Conventionally, a bar-shaped light source such as a halogen lamp or a xenon lamp, or a light source in which a plurality of light-emitting elements such as light-emitting diodes (LEDs) are arrayed may be employed as a light source provided in illuminating apparatuses.

In the case where a light source in which a plurality of light-emitting elements are arrayed is employed, light-emitting elements such as LEDs have strong directivity characteristics in a predetermined direction, and thus uneven illuminance corresponding to the pitch between the light-emitting elements may occur on the light-irradiated face of the original.

For example, as the pitch between the light-emitting elements increases, uneven illuminance on the light-irradiated face of the original becomes more noticeable. Therefore, it is preferable to decrease the pitch. However, if the pitch is decreased, the number of necessary light-emitting elements increases, which invites an increase in cost.

Also, as the optical axis distance of the light-emitting elements to the original decreases, uneven illuminance becomes more noticeable. Therefore, it is preferable to increase the optical axis distance. However, if the optical axis distance is increased, the illuminance on the light-irradiated face of the original decreases, and thus it is necessary to increase the light amount emitted by the light-emitting elements.

From a viewpoint of mitigating uneven illuminance described above, Patent Document 1 described below discloses an illuminating apparatus in which a diffusion member for diffusing light is provided between an original and a light source in which a plurality of light-emitting elements are arrayed. Also, Patent Document 2 described below discloses a light irradiating apparatus in which a plurality of light-emitting elements are arranged in a zigzag manner.

However, with the illuminating apparatus disclosed in Patent Document 1, although uneven illuminance on the light-irradiated face of the original caused by the light-emitting elements can be mitigated by providing the diffusion member between the original and the light source, it is necessary to newly provide the diffusion member, which increases the manufacturing cost. In addition, the illuminance on the light-irradiated face of the original is reduced by the diffusion member, which causes a loss in the light amount when light from the light source is irradiated onto the original. For this reason, it is difficult to apply the illuminating apparatus to image reading apparatuses whose original reading speed is comparatively fast. Also, there is an issue that if the light amount of the light-emitting elements is increased for covering the loss in the light amount, the power consumption increases.

Also, with the light irradiating apparatus disclosed in Patent Document 2, even if the light-emitting elements are disposed in a zigzag manner, if the pitch between the light-emitting elements and the optical axis distance from the light-emitting elements to the original are not in an optimal relationship in the state in which uneven illuminance on the light-irradiated face of the original caused by the light-emitting elements is mitigated, it is impossible to efficiently irradiate light from the light-emitting elements onto the light-irradiated face of the original, while the uneven illuminance is mitigated.

Accordingly, it is desired to achieve an optimal relationship between the pitch and the optical axis distance such that the light from the light-emitting elements is efficiently irradiated onto the light-irradiated face of the original, in the state in which the uneven illuminance on the light-irradiated face of the original caused by the light-emitting elements is mitigated, without providing the diffusion member between the original and the light source in which a plurality of light-emitting elements are arrayed.

In this respect, Patent Document 3 described below discloses an illuminating apparatus which is capable of irradiating an original with light without uneven illuminance, while suppressing an increase in cost, by setting the light amount of a single light-emitting element when reading an image (indicated by "A"), the total light amount (indicated by "B"), the irradiation angle of the light-emitting element (indicated by "a" (rad)), the pitch between the light-emitting elements (indicated by "P"), and the distance from the emission face of the light-emitting element to the original face (indicated by "H") so as to satisfy the relational expressions, $A/B \geq 0.5$ and $P/H \leq 0.6\alpha + 0.25$.

PRIOR ART DOCUMENTS

Patent Documents

[Patent Document 1] JP 2008-172561A
[Patent Document 2] JP 2008-118246A
[Patent Document 3] JP 2008-197432A

SUMMARY OF INVENTION

Problems To Be Solved By the Invention

However, with the illuminating apparatus disclosed in Patent Document 3, the above-stated relational expression $A/B \geq 0.5$ is determined from the viewpoint of reducing the number of the light-emitting elements for obtaining a necessary light amount by simply increasing the value of A/B, and the expression $P/H \leq 0.6\alpha + 0.25$ merely indicates the relation of only when the distance from the emission face of the light source to the original face is fixed (6 mm) (see paragraphs [0036] to [0060]). Thus, it is difficult to say that an optimal relationship can be achieved between the pitch P and the distance H such that light from the light-emitting elements is efficiently irradiated onto the light-irradiated face of the original, in the state in which the uneven illuminance on the light-irradiated face of the original caused by the light-emitting elements is mitigated. Moreover, versatile use of the illuminating apparatus is difficult.

In view of this, the present invention aims at providing an illuminating apparatus, an image reading apparatus and an image forming apparatus that include a light source in which a plurality of light-emitting elements are arrayed, and can achieve an optimal relationship between a pitch between light-emitting elements and an optical axis distance from the light-emitting elements to an original such that light from the light-emitting elements is efficiently irradiated onto a light-irradiated face of the original, in the state in which uneven illuminance on the light-irradiated face of the original caused by the light-emitting elements is mitigated, and also can be used in a versatile manner.

Means For Solving the Problems

In order to solve the above-described issues, the present inventors performed extensive studies for achieving an optimal relationship between a pitch between light-emitting elements and an optical axis distance from the light-emitting elements to an original such that light from the light-emitting elements is efficiently irradiated onto a light-irradiated face of the original, while uneven illuminance on the light-irradiated face of the original caused by the light-emitting elements is mitigated, and realizing versatile use. As a result, the present inventors introduced the concept of unevenness [%], which is obtained by dividing an illuminance difference by an average value in an illuminance cycle that represents repetition of bright and dark areas in a predetermined first direction on a light-irradiated face of the original caused by a plurality of light-emitting elements that emit light toward a light-irradiated region onto the original, the light-irradiated region extending in the first direction, and found a limit range in which uneven illuminance on the light-irradiated face of the original is acceptable and also a range in which uneven illuminance is surely acceptable, based on the relation between the unevenness [%] and an inter-unevenness distance [mm] that is a half cycle of the illuminance cycle, thereby achieving the present invention. This will be described in detail in the section of "Evaluation of uneven illuminance".

The present invention is based on these findings, and provides an illuminating apparatus including a light source in which a plurality of light-emitting elements are arrayed, each light-emitting element irradiating light toward a light-irradiated region onto an original, the region extending in a predetermined first direction, wherein, when P is a light-emitting element pitch [mm] in the first direction of the plurality of light-emitting elements, and H is an optical axis distance [mm] between the plurality of light-emitting elements and the original, and when, in an illuminance cycle representing repetition of bright and dark areas in the first direction on a light-irradiated face of the original caused by the plurality of light-emitting elements, M is an unevenness [%] (=(L1−L2)/L3) [%]) obtained by dividing a value obtained by subtracting a minimum illuminance value L2 from a maximum illuminance value L1 by an average illuminance value L3, and N is an inter-unevenness distance [mm] which is a half cycle of the illuminance cycle, the light-emitting element pitch (P) and the optical axis distance (H) are set such that the unevenness [%] (M) and the inter-unevenness distance [mm] (N) satisfy the relation $M \leq N/2 - 5.5$.

In the present invention, the plurality of light-emitting elements have strong directivity characteristics in a predetermined direction, and the direction achieving the strongest light flux due to the directivity characteristics is used as an optical axis.

The present invention also provides an image reading apparatus including the illuminating apparatus of the present invention.

The present invention also provides an image forming apparatus including the image reading apparatus of the present invention.

According to the illuminating apparatus, the image reading apparatus and the image forming apparatus of the present invention, the relation $M \leq N/2 - 5.5$ was found as a limit range in which uneven illuminance on the light-irradiated face of the original is acceptable. Accordingly, by setting the light-emitting element pitch P and the optical axis distance H so as to satisfy the relation $M \leq N/2 - 5.5$, it is possible to achieve an optimal relationship between the light-emitting element pitch P and the optical axis distance H such that light from the light-emitting elements is efficiently irradiated onto the light-irradiated face of the original, in the state in which uneven illuminance on the light-irradiated face of the original is mitigated. For example, in the state in which uneven illuminance on the light-irradiated face of the original is mitigated, the light-emitting element pitch P can be set to a value which achieves the smallest possible number of the light-emitting elements with respect to the optical axis distance H, or the optical axis distance H can be set to a value which achieves the highest possible illuminance on the light-irradiated face of the original with respect to the light-emitting element pitch P. Moreover, versatile use is possible.

The present inventors also found that if the light-emitting element pitch P and the optical axis distance H satisfy the relation $P/H \leq 0.83$, the relation $M \leq N/2 - 5.5$ is also satisfied. This will be described in detail in the section of "Analysis simulation".

With this specific feature, when the value of one of the light-emitting element pitch P and the optical axis distance H is known, the other can be easily set by setting the other such that the relation $M \leq N/2 - 5.5$ is satisfied, since it is sufficient to insert the light-emitting element pitch P or the optical axis distance H into the relational expression $P/H \leq 0.83$ when setting the light-emitting element pitch P and the optical axis distance H.

With the illuminating apparatus, the image reading apparatus and the image forming apparatus of the present invention, it is preferable that the light-emitting element pitch P and the optical axis distance H are set such that the unevenness [%] M and the inter-unevenness distance [mm] N satisfy the relation $M \leq N/2 - 7.5$.

With this specific feature, the relation $M \leq N/2 - 7.5$ was found as a range in which uneven illuminance on the light-irradiated face of the original is surely acceptable. Accordingly, by setting the light-emitting element pitch P and the optical axis distance H so as to satisfy the relation $M \leq N/2 - 7.5$, it is possible to achieve an optimal relationship between the light-emitting element pitch P and the optical axis distance H such that light from the light-emitting elements is efficiently irradiated onto the light-irradiated face of the original, in the state in which uneven illuminance on the light-irradiated face of the original is further mitigated. For example, in the state in which uneven illuminance on the light-irradiated face of the original is further mitigated, the light-emitting element pitch P can be set to a value which achieves the smallest possible number of the light-emitting elements with respect to the optical axis distance H, or the optical axis distance H can be set to a value which achieves the highest possible illuminance on the light-irradiated face of the original with respect to the light-emitting element pitch P. Moreover, versatile use is possible.

The present inventors also found that if the light-emitting element pitch P and the optical axis distance H satisfy the relation P/H≤0.71, the relation M≤N/2−7.5 is also satisfied. This will be also described in detail in the section of "Analysis simulation".

With this specific feature, when the value of one of the light-emitting element pitch P and the optical axis distance H is known, the other can be easily set by setting the other such that the relation M≤N/2−7.5 is satisfied, since it is sufficient to insert the light-emitting element pitch P or the optical axis distance H into the relational expression P/H≤0.71 when setting the light-emitting element pitch P and the optical axis distance H.

With the illuminating apparatus, the image reading apparatus and the image forming apparatus of the present invention, the following modes (a) and (b) can be provided as specific examples for the plurality of light-emitting elements, namely, mode (a) in which the plurality of light-emitting elements are arrayed only on one side of the light-irradiated region, in a second direction that is orthogonal to the first direction and along the light-irradiated face; and mode (b) in which the plurality of light-emitting elements are arrayed on both sides of the light-irradiated region, in a second direction that is orthogonal to the first direction and along the light-irradiated face.

As an example of the mode (b), a mode can be provided in which the plurality of light-emitting elements include a plurality of first light-emitting elements arrayed in the first direction on one of the two sides, and a plurality of second light-emitting elements arrayed in the first direction on the other side.

In this case, the following modes (b1) and (b2) can be provided as further specific examples, namely, mode (b1) in which the first light-emitting elements and the second light-emitting elements are arrayed such that a pitch between the plurality of first light-emitting elements and a pitch between the plurality of second light-emitting elements are the same distance as the light-emitting element pitch P, and the pitch positions thereof match in the second direction.

mode (b2) in which the first light-emitting elements and the second light-emitting elements are arrayed such that a pitch between the plurality of first light-emitting elements and a pitch between the plurality of second light-emitting elements are a distance that is double the light-emitting element pitch P, and the pitch positions thereof are staggered by a half the pitch.

With the mode (b1), compared with the mode (a), the number of the light-emitting elements can be doubled, thereby doubling the illuminance. Also, with the mode (b2), compared with the mode (b1), the illuminance can be reduced by half, thereby reducing the number of the light-emitting elements by half.

With the illuminating apparatus, the image reading apparatus and the image forming apparatus of the present invention, the plurality of light-emitting elements may be mounted on a light source substrate, and each may include an emission face for performing one of side light emission in which light is emitted such that an optical axis is parallel to a substrate face of the light source substrate and top-face light emission in which light is emitted such that the optical axis is orthogonal to the substrate face of the light source substrate.

In this case, the plurality of first light-emitting elements may have an emission face for performing one of the side light emission and the top-face light emission, and the plurality of second light-emitting element may have an emission face for performing one of the side light emission and the top-face light emission.

With the present invention, it is possible to mitigate uneven illuminance on the light-irradiated face of the original and obtain a favorable image without providing a diffusion member provided in conventional illuminating apparatuses between the original and the light source.

Accordingly, in the image reading apparatus of the present invention, it is possible that the image reading apparatus includes a light-transmitting original stage, and the light source directly irradiates the original via the original stage.

With this specific feature, since it is not necessary to provide a diffusion member provided in conventional configurations between the original and the light source, the manufacturing cost is not increased, and also, loss in the light amount when light from the light source is irradiated onto the original can be prevented.

Effects of the Invention

As described above, with the illuminating apparatus, the image reading apparatus and the image forming apparatus of the present invention, since the light-emitting element pitch P and the optical axis distance H are set so as to satisfy the relation M≤N/2−5.5 (limit range in which uneven illuminance is acceptable), it is possible to achieve an optimal relationship between the light-emitting element pitch P and the optical axis distance H, in the state in which uneven illuminance on the light-irradiated face of the original is mitigated, and also versatile use is available.

Furthermore, when the light-emitting element pitch P and the optical axis distance H is set so as to satisfy the relation M≤N/2−7.5 (range in which uneven illuminance is surely acceptable), it is possible to achieve an optimal relationship between the light-emitting element pitch P and the optical axis distance H, in the state in which uneven illuminance on the light-irradiated face of the original is further mitigated.

BRIEF DESCRIPTION OF DRAWINGS

FIG. 3 shows diagrams each illustrating a schematic configuration of a light source unit that is an example of the illuminating apparatus according to the embodiment, and FIG. 3(a) is a perspective view thereof and FIG. 3(b) is an exploded perspective view thereof.

FIG. 4(a) is a schematic side view thereof and FIG. 4(b) is a schematic plan view thereof.

FIG. 7 shows schematic side views each illustrating an example of a plurality of light-emitting elements each having an emission face for performing top-face light emission, and FIG. 7(a) is a diagram illustrating an example in which first light-emitting elements and second light-emitting elements that are respectively disposed on both sides perform top-face light emission and FIG. 7(b) is a diagram illustrating an example in which light-emitting elements disposed only on one side performs top-face light emission.

FIG. 9 is a chart showing the illuminance cycle, amplitude [%] K, the inter-unevenness distance [mm] N and the unevenness [%] M calculated from these values, and evaluation results of the printed image.

FIG. 12 shows graphs each illustrating, at one of the LED pitch values employed in the analysis simulation, the illuminance [lx] on the light-irradiated face of the original with respect to the distance in the main scanning direction [mm] at several values of the optical axis distance. FIGS. 12(a) and 12(b) show graphs of the LED pitches of 8 mm and 10 mm, respectively.

FIGS. 13(a) and 13(b) show graphs of the LED pitches of 12 mm and 14 mm, respectively.

FIGS. 14(a) and FIG. 14(b) show graphs of the LED pitches of 16 mm and 18 mm, respectively.

FIG. 16 is a diagram showing P/H evaluation results obtained when the LED pitch is a value ranging from 4 mm to 11 mm in increments of 1 mm, and the optical axis distance is a value ranging from 4 mm to 24 mm in increments of 1 mm.

FIG. 17 is a diagram showing P/H evaluation results obtained when the LED pitch is a value ranging from 12 mm to 19 mm in increments of 1 mm, and the optical axis distance is a value ranging from 4 mm to 24 mm in increments of 1 mm.

MODES FOR CARRYING OUT THE INVENTION

An embodiment of the present invention will be described below with reference to the drawings. Note that the following embodiments are examples of embodying the invention, and do not limit the technical scope of the invention.

Figure 1:
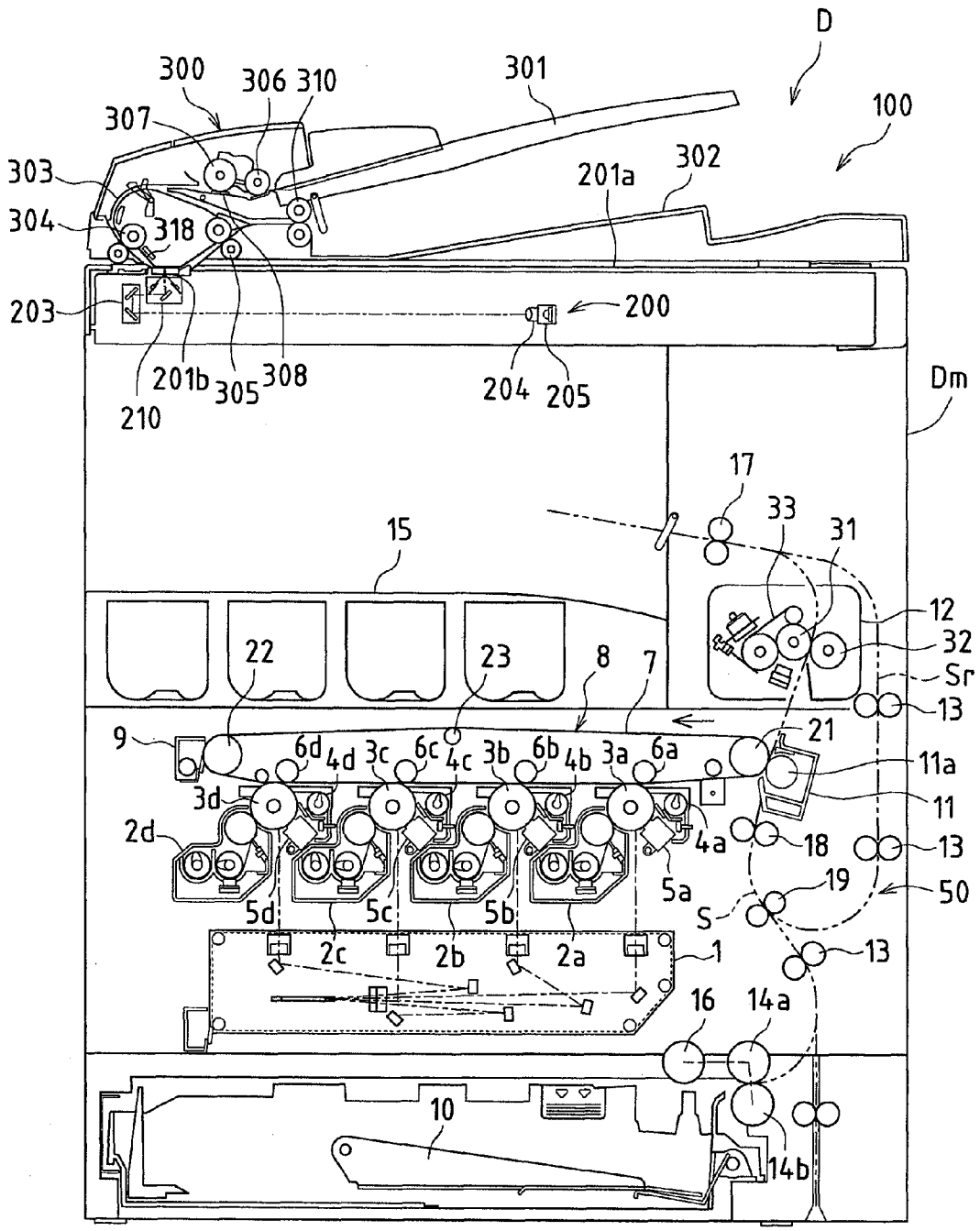
FIG. 1 is a side view schematically illustrating an image forming apparatus provided with an image reading apparatus to which an illuminating apparatus according to an embodiment of the present invention is applied.

FIG. 1 is a side view schematically showing an image forming apparatus D provided with an image reading apparatus 100 to which an illuminating apparatus according to an embodiment of the present embodiment is applied.

The image forming apparatus D shown in FIG. 1 is provided with the image reading apparatus 100, which reads an image of an original G (see FIG. 2 or the like to be described later) and an apparatus main body Dm, which records and forms the image on the original G read by the image reading apparatus 100 or images received from the outside source in color or in monochrome on a recording sheet such as plain paper.

Overall Configuration of Image Forming Apparatus

The apparatus main body Dm of the image forming apparatus D includes an exposing apparatus 1, development apparatuses 2 (2a, 2b, 2c and 2d), photosensitive drums 3 (3a, 3b, 3c and 3d) that function as image carriers, charging units 5 (5a, 5b, 5c and 5d), cleaner apparatuses 4 (4a, 4b, 4c and 4d), an intermediate transfer belt apparatus 8 that includes intermediate transfer rollers 6 (6a, 6b, 6c and 6d) that functions as a transfer portion, a fixing apparatus 12, a sheet transport apparatus 50, a paper feed tray 10 that functions as a paper feed portion, and a paper discharge tray 15 that functions as a paper discharge portion.

The image data handled in the apparatus main body Dm of the image forming apparatus D corresponds to a color image using the colors black (K), cyan (C), magenta (M), and yellow (Y), or corresponds to a monochrome image using a single color (e.g., black). Accordingly, four each of the development apparatuses 2 (2a, 2b, 2c and 2d), the photosensitive drums 3 (3a, 3b, 3c and 3d), the charging units 5 (5a, 5b, 5c and 5d), the cleaner apparatuses 4 (4a, 4b, 4c and 4d), and the intermediate transfer rollers 6 (6a, 6b, 6c and 6d) are provided so as to form four images corresponding to the respective colors, thus forming four image stations. The suffix letters "a" to "d" respectively correspond to black, cyan, magenta, and yellow. In the description below, the suffix letters "a" to "d" are omitted.

The photosensitive drums 3 are arranged substantially in the center of the apparatus main body Dm with respect to the vertical direction. The charging units 5 are charging means for evenly charging the surface of the photosensitive drums 3 to a predetermined potential, and may be of the roller type or of the brush type, which are contact types, but may also be of the charger type.

Here, the exposing apparatus 1 is a laser scanning unit (LSU) including a laser diode and a reflecting mirror, and exposes the surface of the charged photosensitive drums 3 to light according to image data, thereby forming on the surface an electrostatic latent image according to the image data.

The development apparatuses 2 develop an electrostatic latent image formed on the photosensitive drums 3 with four colors (K, C, M and Y) of toners. The cleaner apparatuses 4 remove and collect toner remaining on the surface of the photosensitive drums 3 after developing and transferring an image.

The intermediate transfer belt apparatus 8 arranged above the photosensitive drums 3 includes, other than the intermediate transfer rollers 6, an intermediate transfer belt 7, an intermediate transfer belt drive roller 21, an idler roller 22, a tension roller 23 and an intermediate transfer belt cleaning apparatus 9.

Roller members such as the intermediate transfer belt drive roller 21, the intermediate transfer rollers 6, the idler roller 22, the tension roller 23 or the like support the intermediate transfer belt 7 in a stretched and tensioned manner, and rotate the intermediate transfer belt 7 around in a prescribed sheet transport direction (direction of the arrow in the drawing).

The intermediate transfer rollers 6 are rotatably supported inside the intermediate transfer belt 7, and pressed against the photosensitive drums 3 via the intermediate transfer belt 7.

The intermediate transfer belt 7 is provided contacting the respective photosensitive drums 3, and the toner images on the surfaces of the respective photosensitive drums 3 are sequentially transferred and superposed on the intermediate transfer belt 7, forming a color toner image (a toner image containing the respective colors). Here, the transfer belt 7 is formed as an endless belt using a film having a thickness of 100 μm to 150 μm, approximately.

The toner images are transferred from the photosensitive drums 3 to the intermediate transfer belt 7 using the intermediate transfer rollers 6 pressed against the inner side (back face) of the intermediate transfer belt 7. A high-voltage transfer bias (for example, a high voltage of the opposite polarity (+) to the charge polarity (−) of the toner) is applied to the intermediate transfer rollers 6 for transferring the toner images. The intermediate transfer rollers 6 are rollers including a base that is made of a metal (e.g., stainless steel) shaft having a diameter of 8 to 10 mm, the surface of the shaft being covered by an electrically conductive elastic material (e.g., EPDM, urethane foam, etc.). The electrically conductive elastic material enables a high voltage to be evenly applied to a recording sheet.

The apparatus main body Dm of the image forming apparatus D further includes a secondary transfer apparatus 11 that includes a transfer roller 11a functioning as a transfer portion. The transfer roller 11a contacts the side (outer side) opposite to the intermediate transfer belt drive roller 21 of the intermediate transfer belt 7.

As described above, toner images on the surfaces of the respective photosensitive drums 3 are superposed on the intermediate transfer belt 7, forming a toner image of colors represented by the image data. The toner images of the respective colors superposed in this manner are transported with the intermediate transfer belt 7, and are transferred on a recording sheet by the secondary transfer apparatus 11.

The intermediate transfer belt 7 and the transfer roller 11a of the secondary transfer apparatus 11 are pressed to each other to form a nip region. A voltage is applied to the transfer roller 11a of the secondary transfer apparatus 11 (for example, a high voltage of the opposite polarity (+) to the charge polarity (−) of the toner) in order to transfer the toner images of the respective colors on the intermediate transfer belt 7 to the recording sheet. Furthermore, in order to constantly maintain the nip region, one of the transfer rollers 11a of the secondary transfer apparatus 11 and the intermediate transfer belt drive roller 21 is made of a hard material (metal, etc.), and the other is made of a soft material such as an elastic roller (elastic rubber roller, foamable resin roller, etc.).

The toner image on the intermediate transfer belt 7 may not be completely transferred by the secondary transfer apparatus 11 to the recording sheet, and toner may remain on the intermediate transfer belt 7. This residual toner causes toner color mixing in the following step. Accordingly, residual toner is removed and collected by the intermediate transfer belt cleaning apparatus 9. The intermediate transfer belt cleaning apparatus 9 includes, for example, a cleaning blade that is in contact with the intermediate transfer belt 7 as a cleaning member, and residual toner can be removed and collected by the cleaning blade. The idler roller 22 supports the intermediate transfer belt 7 from the inner side (back face), and the cleaning blade is in contact with the intermediate transfer belt 7 to press from outside against the idler roller 22.

The paper feed tray 10 is a tray in which recording sheets are stored, and is disposed below the image forming portion of the apparatus main body Dm. The paper discharge tray 15 disposed above the image forming portion is a tray on which printed recording sheets are placed facedown.

In addition, in the apparatus main body Dm is provided the sheet transport apparatus 50 for feeding the recording sheet in the paper feed tray 10 to the paper discharge tray 15 via the secondary transfer apparatus 11 and the fixing apparatus 12. The sheet transport apparatus 50 includes an S-shaped sheet transport path S, and transport members such as a pickup roller 16, a separation roller 14a, a separation roller 14b, transport rollers 13, a pre-registration roller pair 19, a registration roller pair 18, the fixing apparatus 12 and discharge rollers 17 are arranged along the sheet transport path S.

The pickup roller 16 is a draw-in roller that is disposed in a downstream side end portion in the sheet transport direction of the paper feed tray 10 and that feeds recording sheets sheet by sheet from the paper feed tray 10 into the paper transport path S. The separation roller 14a allows recording sheets to pass between the separation roller 14a and the separation roller 14b to separate the sheets into individual sheets and transports the separated sheets to the sheet transport path S. The transport rollers 13 and the pre-registration roller pair 19 are small rollers for facilitating and assisting transportation of the recording sheets. The transport rollers 13 are disposed in plural locations in the sheet transport path S. The pre-registration roller pair 19 is disposed in a position right before the registration roller pair 18 on the upstream side in the sheet transport direction, and transports the recording sheet to the registration roller pair 18.

The fixing apparatus 12 receives a recording sheet onto which a toner image has been transferred, and transports the recording sheet while sandwiching the recording sheet between a heat roller 31 and a pressure roller 32.

The temperature of the heat roller 31 is controlled to a prescribed fixing temperature, and performs thermal pressing on the recording sheet with the pressure roller 32 to melt, mix and press the toner images transferred on the recording sheet, thereby thermally fixing the toner images on the recording sheet. Also, an external heating belt 33 is provided in the fixing apparatus 12 in order to heat the heat roller 31 from outside.

After the toner images of the respective colors are fixed, the recording sheet is discharged to the paper discharge tray 15 by the discharge rollers 17.

Note that it is possible to form a monochrome image by using only one of the four image forming stations, and transfer the monochrome image to the intermediate transfer belt 7 of the intermediate transfer belt apparatus 8. The monochrome image is also transferred to the recording sheet from the intermediate transfer belt 7, similarly to the color image, and fixed on the recording sheet.

Also, in the case where an image is formed not only on the front face of the recording sheet, but on both faces, after the image on the front face of the recording sheet is fixed by the fixing apparatus 12, the discharge rollers 17 are stopped while the recording sheet is transported by the discharge rollers 17 in the sheet transport path S, and then discharge rollers 17 are rotated in reverse to allow the recording sheet to pass a front-back reverse route Sr. The front and back faces of the recording sheet are then inverted, and the recording sheet is again guided to the registration roller pair 18. Then, an image is recorded and fixed on the back face of the recording sheet similarly to the front face of the recording sheet, and the recording sheet is discharged to the paper discharge tray 15.

Overall Configuration of Image Reading Apparatus

Figure 2:
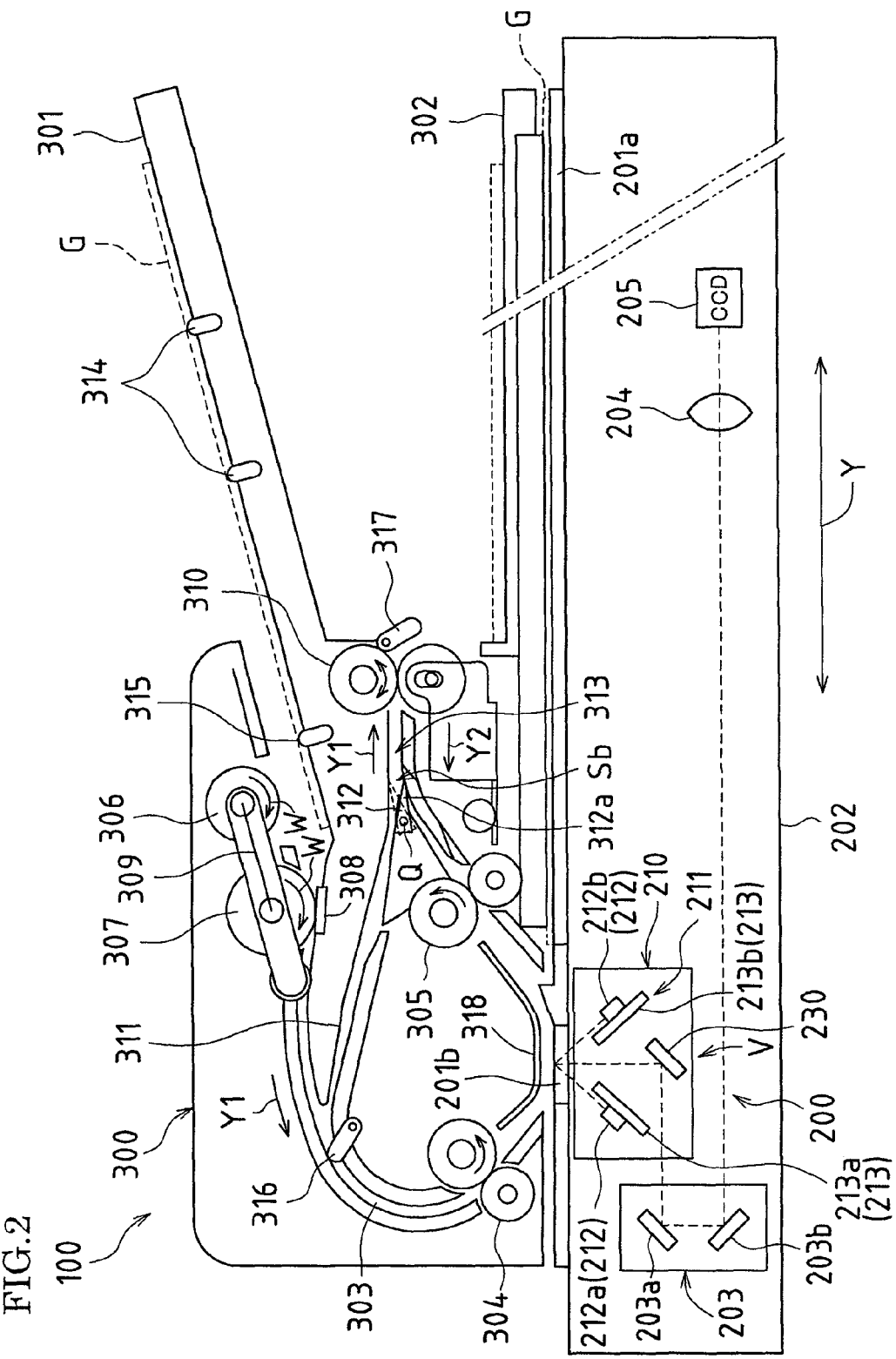
FIG. 2 is a schematic cross-sectional view of the image reading apparatus shown in FIG. 1.

FIG. 2 is a schematic cross-sectional view of the image reading apparatus 100 shown in FIG. 1. The image reading apparatus 100 shown in FIGS. 1 and 2 is provided with a configuration to read an original image while keeping the original G fixed in a stationary original reading arrangement, and a configuration to read an original image while moving the original G in a moving original reading arrangement.

That is, the image reading apparatus 100 has a stationary original reading configuration in which original G placed on a platen glass 201a that is an example of an original stage is illuminated by a light source 211 via the platen glass 201a, and the original image is read by scanning light reflected from the original G that is illuminated by the light source 211 in a main scanning direction (see direction of a below-described arrow X in FIG. 3) orthogonal to a sub-scanning direction (to one side in the direction of the arrow Y in the drawings), while the light source 211 is moved in the sub-scanning direction Y, and a moving original reading configuration in which while illuminating the original G transported by an automatic original feeding apparatus 300 to one side in the sub-scanning direction Y so as to pass over an original reading glass 201b, which is another example of the original stage, by the light source 211 positioned at a home position V in an original reading portion 200 via the glass 201b, light reflected from the original G illuminated by the light source 211 is scanned in the main scanning direction X, thereby reading the original image. Note that FIG. 2 shows a state in which the light source 211 is in the home position V.

Specifically, the original reading portion 200 includes the platen glass 201a, a light source unit 210 including the light source 211 (example of the illuminating apparatus), an optical system driving portion that moves the light source 211 (not shown in the drawings), a mirror unit 203, a condenser lens 204 and an imaging element (here, CCD) 205. Also, the light source 211 is disposed in the light source unit 210. These are accommodated in a metal frame (hereinafter referred to as a "frame body") 202. Note that the light source unit 210 will be described in detail later.

The platen glass 201a is made of a transparent glass plate, and both end portions thereof in the main scanning direction X are placed on the frame body 202. Note that the automatic original feeding apparatus 300 is capable of opening and closing with respect to the original reading portion 200 about an axis line along the sub-scanning direction Y (pivotably supported by a hinge, for example), and its bottom face also functions as an original pressing member for pressing the original G placed on the platen glass 201a of the original reading portion 200 from above.

The mirror unit 203 includes a second mirror 203a, a third mirror 203b and a supporting member (not shown). The supporting member supports the second mirror 203a so as to reflect light from a first mirror 230 in the light source unit 210 to be guided to the third mirror 203b, and also supports the third mirror 203b so as to reflect light from the second mirror 203a to be guided to the condenser lens 204. The condenser lens 204 condenses light from the third mirror 203b to the imaging element 205. The imaging element 205 converts light from the condenser lens 204 (original image light) to electric signals as image data.

In addition, the optical system driving portion is configured to move the light source unit 210 at a constant speed in the sub-scanning direction Y, and at the same time, move the mirror unit 203 at a moving speed that is half the moving speed of the light source unit 210 also in the sub-scanning direction Y.

Here, the original reading portion 200 supports not only the stationary original reading arrangement, but also the moving original reading arrangement as well, and thus includes the original reading glass 201b. Accordingly, the optical system driving portion is further configured to position the light source unit 210 in the prescribed home position V below the original reading glass 201b. Note that although the platen glass 201a and the original reading glass 201b are independent elements in this embodiment, they may be formed as one element.

The automatic original feeding apparatus 300 includes an original tray 301 on which the original G is placed for transportation, a discharge tray 302 arranged below the original tray 301, a first transport path 303 that connects the original tray 301 and the discharge tray 302, and two transport roller pairs including an upstream side transport roller pair 304 and a downstream side transport roller pair 305 that transport the original G on the upstream side and downstream side, respectively, in a transport direction Y1 of the original G, with respect to the original reading glass 201b. Specifically, the upstream side transport roller pair 304, the original reading glass 201b and the downstream side transport roller pair 305 are arranged in this order in the transport direction Y1. Also, the original reading glass 201b is disposed substantially horizontally so as to form the transport wall of the first transport path 303.

The automatic original feeding apparatus 300 further includes a pickup roller 306, a separation roller 307 and a separation member 308 such as a separation pad.

The pickup roller 306 feeds forward the original G placed on the original tray 301 from the original tray 301 to the first transport path 303 in the transport direction Y1. The separation roller 307 is arranged on the downstream side in the transport direction Y1 relative to the pickup roller 306, and sandwiches the original G sent by the pickup roller 306 with the separation member 308, and further transports the original G to the downstream side in the transport direction Y1. The separation member 308 is opposed to the separation roller 307 and singularizes (separates) the originals G transported therebetween into individual sheets.

The automatic original feeding apparatus 300 configured as described above transports the originals G up to between the separation roller 307 and the separation member 308 by the pickup roller 306, where the originals G are singularized and separated and are at the same time transported sheet by sheet as a result of the separation roller 307 being driven to rotate. Then, the original G transported by the separation roller 307 is guided by the first transport path 303, thereby making it possible to feed the original G sheet by sheet toward the upstream side transport roller pair 304.

Specifically, the pickup roller 306 can contact and be separated from the original G placed on the original tray 301 with the use of a pickup roller drive portion not shown in the drawings. In addition, the pickup roller 306 is connected to the separation roller 307 via a drive transmission means 309 including an endless belt or the like so as to rotate in the same direction as the separation roller 307. When there is a request to read the original G, the pickup roller 306 and the separation roller 307 are driven by an original feed drive portion not shown in the drawings to rotate in a direction with which the original G is transported in the transport direction Y1 (the arrow W in FIG. 2).

In the present embodiment, the automatic original feeding apparatus 300 is also configured such that, after transporting the original G so as to enable reading one face thereof, the original G can be inverted so as to reverse the front and back faces thereof, thereby transporting the original G so as to enable reading the other face thereof.

Specifically, in addition to the above-described configuration, the automatic original feeding apparatus 300 further includes a reverse roller pair 310, a second transport path 311 and a switching claw 312.

The first transport path 303 is formed as a loop to transport the original G from the separation roller 307 to the discharge tray 302, via the upstream side transport roller pair 304, the original reading glass 201b, the downstream side transport roller pair 305 and the reverse roller pair 310. The reverse roller pair 310 is disposed on the downstream side in the transport direction Y1 relative to the downstream side transport roller pair 305, and transports the original G transported from the downstream side transport roller pair 305 such that the trailing end of the original G (the upstream side end in the transport direction Y1) is in the front. The second transport path 311 is branched at a branch portion Sb between the reverse roller pair 310 and the downstream side transport roller pair 305, and guides the original G transported by the reverse roller pair 310 such that its trailing end is in the front to the further upstream side in the transport direction Y1 than the upstream side transport roller pair 304 of the first transport path 303, in order to invert the front and back faces of the original G. A switchback transport path 313 is formed between the reverse roller pair 310 and the branch portion Sb of the first transport path 303. The switchback transport path 313 is capable of transportation of the original G by forward rotation of the reverse roller pair 310 (the transport direction Y1 of the original G) and reverse transportation of the original G by reverse rotation of the reverse roller pair 310.

The switching claw 312 is arranged in the branch portion Sb, and is configured to be capable of taking a first switching posture in which the original G is guided to the upstream side transport roller pair 304 from the reverse roller pair 310 via the second transport path 311, and a second switching posture in which the original G is guided to the reverse roller pair 310 from the downstream side transport roller pair 305 via the switchback transport path 313.

Here, in a normal state, the switching claw 312 is arranged directly connecting the switchback transport path 313 and the second transport path 311 (first switching posture, see the solid line in FIG. 2). When the original G whose original image has been read by the original reading portion 200 is transported in the transport direction Y1, the leading end of the original G (the downstream side end in the transport direction Y1) pushes up the switching claw 312 to guide the original G to the switchback transport path 313 (second switching posture, see the dashed line in FIG. 2). The branching claw 312 is capable of freely swaying about a swaying axis Q along the axis line direction of the reverse roller pair 310 such that a claw portion 312a drops due to its own weight, thereby blocking the first transport path 303 between the downstream side transport roller pair 305 and the reverse roller pair 310 to take the first switching posture. When the trailing end of the original G is positioned in the switchback transport path 313, and the original G is transported in reverse in a reverse-transport direction (direction of the arrow Y2 in FIG. 2) that is the opposite direction to the transport direction Y1 of the original G by the reverse roller pair 310 rotating in the reverse direction, the switching claw 312 guides the original G to the second transport path 311.

Note that the size of the original G placed on the original tray 301 is detected by an original size sensor 314 disposed in an original placement portion of the original tray 301. Whether an original G is placed on the original tray 301 or not is detected by an original detecting sensor 315 disposed near the pickup roller 306 of the original placement portion of the original tray 301. Also, in a stopped state, the upstream side transport roller pair 304 causes the leading end of the original G transported by the separation roller 307 to abut against the same for alignment, and is driven to rotate in accordance with the timing for reading. The original G thus transported is detected by a transport sensor 316 that is disposed on the further downstream side than the second transport path 311 and also on the further downstream side than the upstream side transport roller pair 304, in the transport direction Y1 of the first transport path 303. The original G discharged by the reverse roller pair 310 is detected by a discharge sensor 317 disposed near the reverse roller pair 310 on the discharge side relative to the reverse roller pair 310. Note that the transport roller pairs 304 and 305, the reverse roller pair 310 or the like are driven by a transport system drive portion, which is not shown in the drawings.

Also, in the present embodiment, the original reading portion 200 further includes a reading guide 318 that faces the original reading glass 201b with the transported original G interposed therebetween.

In the image reading apparatus 100 described above, when an instruction to read the original image of the original G by the stationary original reading arrangement is made, the light source unit 210 moves to one side in the sub-scanning direction Y at a constant speed while irradiating the original G placed on the platen glass 201a with light via the platen glass 201a, thereby scanning the image of the original G. At the same time, the mirror unit 203 also moves to the one side in the sub-scanning direction Y at a moving speed that is half the moving speed of the light source unit 210.

Light reflected from the original G illuminated by the light source unit 210 is reflected by the first mirror 230 provided in the light source unit 210 and then the optical path of this reflected light is converted by 180° by the second and third mirrors 203a and 203b of the mirror unit 203. Light reflected by the third mirror 203b forms an image on the imaging element 205 via the condenser lens 204, and here the original image light is read and converted to electric image data.

When an instruction to read the original image on the original G by the moving original reading system is made, the automatic original feeding apparatus 300 transports the original G to one side in the sub-scanning direction Y so as to pass a portion above the position V indicated in FIG. 2, while the light source unit 210 and the mirror unit 203 stay in the position V indicated in FIG. 2. That is, the originals G placed on the original tray 301 are taken out by the pickup roller 306, separated by the separation roller 307 and the separation member 308 into individual sheets, and transported to the first transport path 303. After transportation of the original G is confirmed by the transport sensor 316, the leading end of the original G transported to the first transport path 303 is aligned to prevent slanted transportation of the original G and sent out at a prescribed timing for reading by the upstream side transport roller pair 304, then the front and back faces are inverted and transported to the original reading glass 201b.

Onto one face of the original G that passes above the original reading glass 201b, light from the light source unit 210 is irradiated via the original reading glass 201b and reflected by the one face. The light reflected by the one face of the original G is reflected by the first mirror 230 similarly to the above-described stationary original reading arrangement, and thereafter the optical path of the reflected light is converted by 180° by the second and third mirrors 203a and 203b of the mirror unit 203. Light reflected from the third mirror 203b forms an image on the imaging element 205 via the condenser lens 204, and here the original image is read and converted to electric image data. Note that this reading operation by the imaging element 205 is the same in the case of duplex reading to be described later, and the operation will not be described below.

The original G that has been read is drawn off the reading glass 201b by the downstream side transport roller pair 305, and discharged onto the discharge tray 302 by the reverse roller pair 310, which is capable of forward and reverse rotation, via the switchback transport path 313 of the first transport path 303.

Also, in the case where both faces of the original G are read, the original G one face of which has been read is not discharged to the discharge tray 302, but transported such that its trailing end is positioned in the switchback transport path 313. The original G is then transported in reverse in the reverse-transport direction Y2 by the reverse roller pair 310 rotating in reverse, and guided to the second transport path 311 by the switching claw 312 in the first switching posture. The original G guided to the second transport path 311 is again returned to the first transport path 303 via the second transport path 311 and as a result, the original G is transported by the upstream side transport roller pair 304 with the front and back faces thereof inverted, passes above the original reading glass 201b, and thus the other face of it is read. The original G both faces of which have been read again returns to the first transport path 303 and is transported by the transport roller pairs 304 and 305 with the front and back faces thereof inverted. Thereafter, the original G passes the switchback transport path 313 of the first transport path 303, and is discharged to the discharge tray 302 via the reverse roller pair 310 rotating in the forward direction.

Description of Characteristic Portions of the Invention

Figure 4:
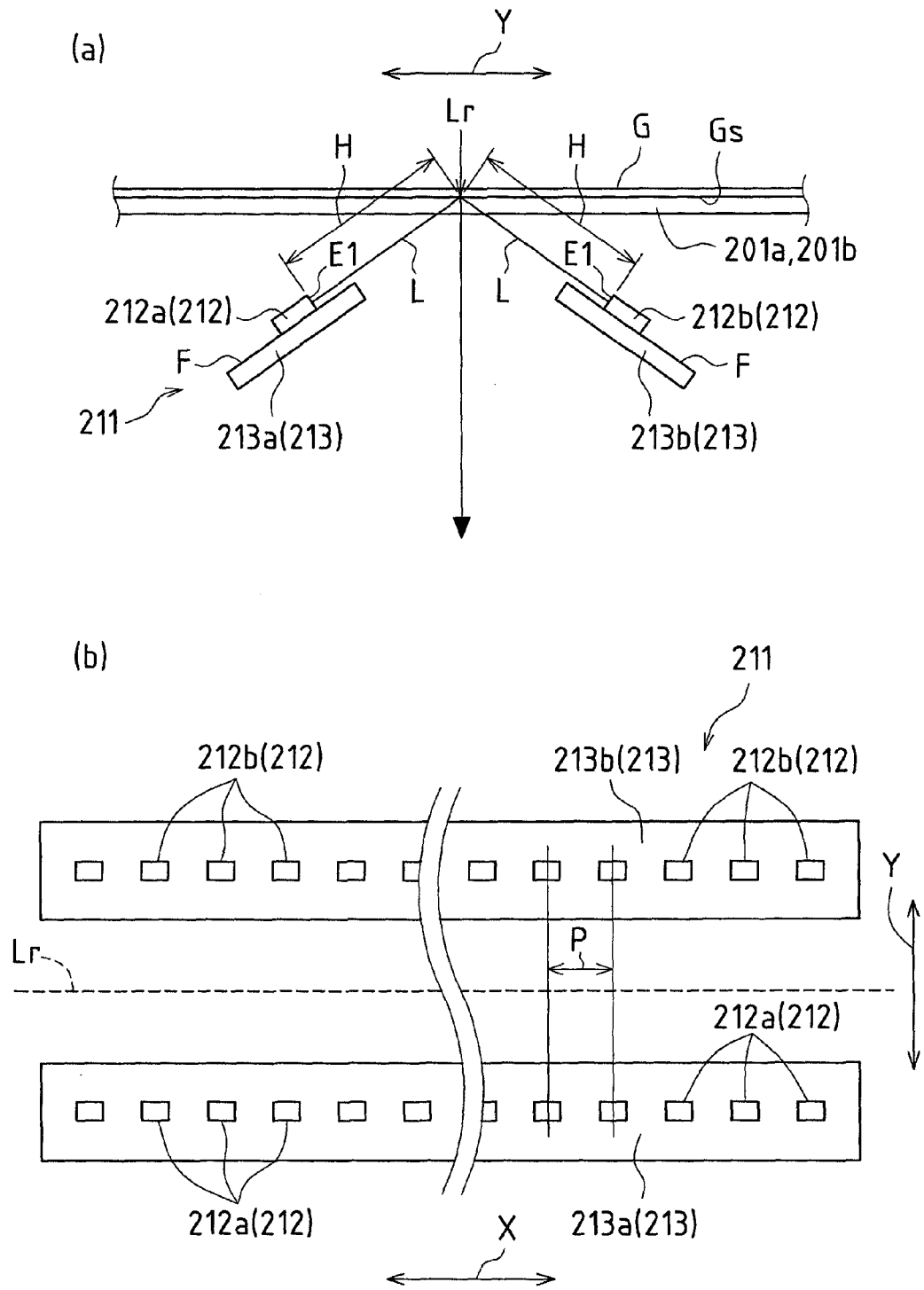
FIG. 4 shows diagrams each illustrating a light source in the light source unit.

FIG. 3 shows diagrams each illustrating a schematic configuration of the light source unit 210, which is an example of the illuminating apparatus according to the present embodiment. FIG. 3(a) is a perspective view thereof and FIG. 3(b) is an exploded perspective view thereof. FIG. 4 shows diagrams each illustrating the light source 211 in the light source unit 210. FIG. 4(a) is a schematic side view thereof and FIG. 4(b) is a schematic plan view thereof. Note that FIG. 4(a) also shows the platen glasses 201a and 201b and the original G.

The light source 211 provided in the light source unit 210 according to the present embodiment includes a plurality of light-emitting elements 212, and a light source substrate 213 on which the light-emitting elements 212 are mounted. Note that the light-emitting elements are of the same type, and have substantially the same light amount, directivity characteristics at the time of light emission, or the like.

The plurality of light-emitting elements 212 emit light toward a light-irradiated region Lr, which is a fixed region and extends in a predetermined first direction (here, the main scanning direction X) on the original G, and are arrayed along a light-irradiated face Gs of the original G. The light-irradiated region Lr serves as the original reading position.

In the present embodiment, the plurality of light-emitting elements 212 are arrayed on both sides in a second direction (here, the sub-scanning direction Y) that is orthogonal to the first direction and along the light-irradiated face Gs, with respect to the light-irradiated region Lr. The plurality of light-emitting elements 212 are disposed such that their optical axes L meet in the light-irradiated region Lr forming a right angle, when viewed in the main scanning direction X.

Specifically, with respect to the plurality of light-emitting elements 212 on both sides, a plurality of first light-emitting elements 212a are arrayed on one side along the main scanning direction X, and a plurality of second light-emitting elements 212b are arrayed on the other side along the main scanning direction X. That is, the plurality of light-emitting elements 212 are arrayed in two lines, namely, a first light-emitting element array formed by the plurality of first light-emitting elements 212a and a second light-emitting element array formed by the plurality of second light-emitting elements 212b.

The light source substrate 213 is constituted by a first light source substrate 213a and a second light source substrate 213b that extend in the main scanning direction X and are parallel to each other. The plurality of first light-emitting elements 212a are mounted on the first light source substrate 213a, and the plurality of second light-emitting elements 212b are mounted on the second light source substrate 213b.

Also, in the present embodiment, the pitch between the plurality of first light-emitting elements 212a and the pitch between the plurality of second light-emitting elements 212b are the same as a light-emitting element pitch P (distance in the main scanning direction X between the centers of adjacent elements). Furthermore, in the first light-emitting element array and the second light-emitting element array, the first light-emitting elements 212a and the second light-emitting elements 212b are arranged such that the pitch positions thereof match in the sub-scanning direction Y (hereinafter referred to as a "same pitch position configuration").

Also, in the present embodiment, as shown in FIG. 4(a), the plurality of first light-emitting elements 212a each include an emission face El for performing side light emission, in which light is emitted such that the optical axis L is parallel to a substrate face F of the first light source substrate 213a on which the plurality of first light-emitting elements 212a are mounted, and the plurality of second light-emitting elements 212b each include an emission face El for performing side light emission, in which light is emitted such that the optical axis L is parallel to a substrate face F of the second light source substrate 213b on which the plurality of second light-emitting elements 212b are mounted. Specifically, the first light source substrate 213a on which the first light-emitting elements 212a are mounted and the second light source substrate 213b on which the second light-emitting elements 212b are mounted are arranged, in the side view, in a shape that widens toward the bottom in which the distance between the substrates increases with increasing distance from the original, such that the optical axis L is directed to the light-irradiated region Lr. Note that the light-irradiated region Lr is located in the middle between the first light source substrate 213a and the second light source substrate 213b.

Figure 5:
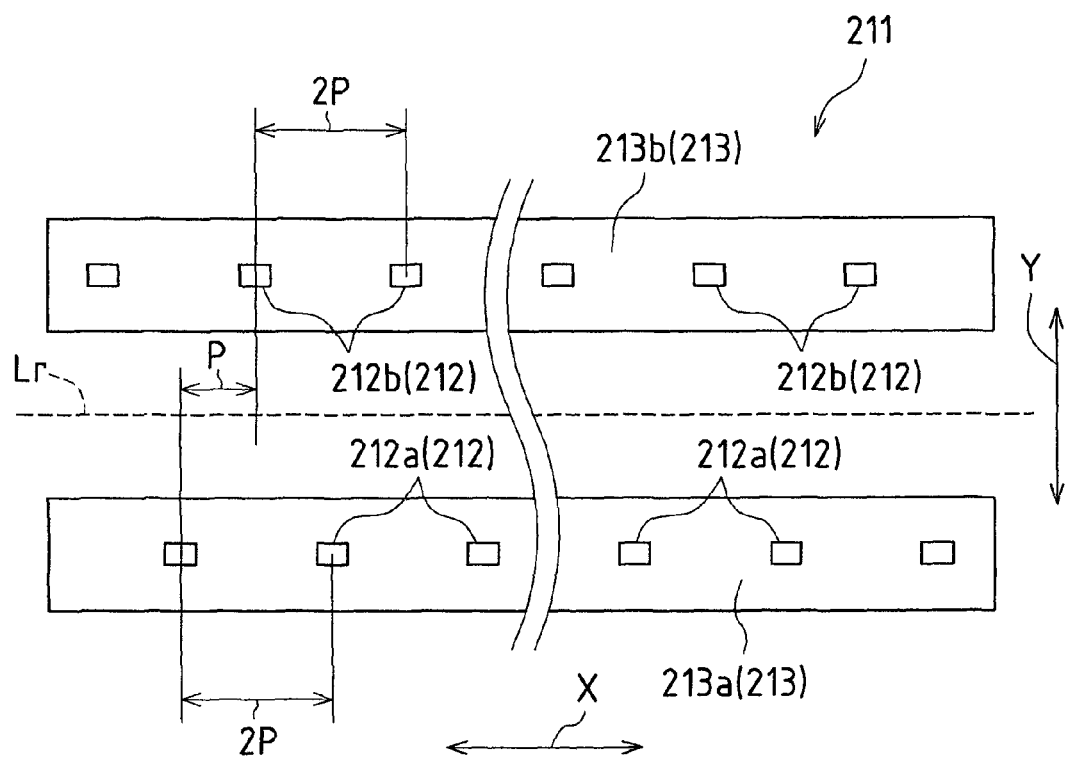
FIG. 5 is a schematic plan view of another array example of first light-emitting element array and second light-emitting element array shown in FIG. 4.

FIG. 5 is a schematic plan view of another array example of the first light-emitting element array and the second light-emitting element array shown in FIG. 4. Note that in FIG. 5, the same elements as those in FIG. 4 are assigned the same reference numerals, and the description thereof is omitted. This also applies to FIGS. 6 and 7 to be described below.

In the array example of the first light-emitting element array and the second light-emitting element array shown in FIG. 5, the light-emitting element pitch P in the main scanning direction X refers to the pitch between a first light-emitting element 212a in the first light-emitting element array and a second light-emitting elements 212b in the second light-emitting element array.

That is, the pitch between the plurality of first light-emitting elements 212a and the pitch between the plurality of second light-emitting elements 212b are each set to a distance that is twice the light-emitting element pitch P. Furthermore, in the first light-emitting element array and the second light-emitting element array, the first light-emitting elements 212a and the second light-emitting elements 212b are arrayed such that their pitch positions are staggered by a half the pitch (in a zigzag manner).

In the configurations shown in FIGS. 4 and 5, although a plurality of light-emitting elements 212 are arrayed on both sides in the sub-scanning direction Y with respect to the light-irradiated region Lr, they may be arrayed only on one side.

Figure 6:
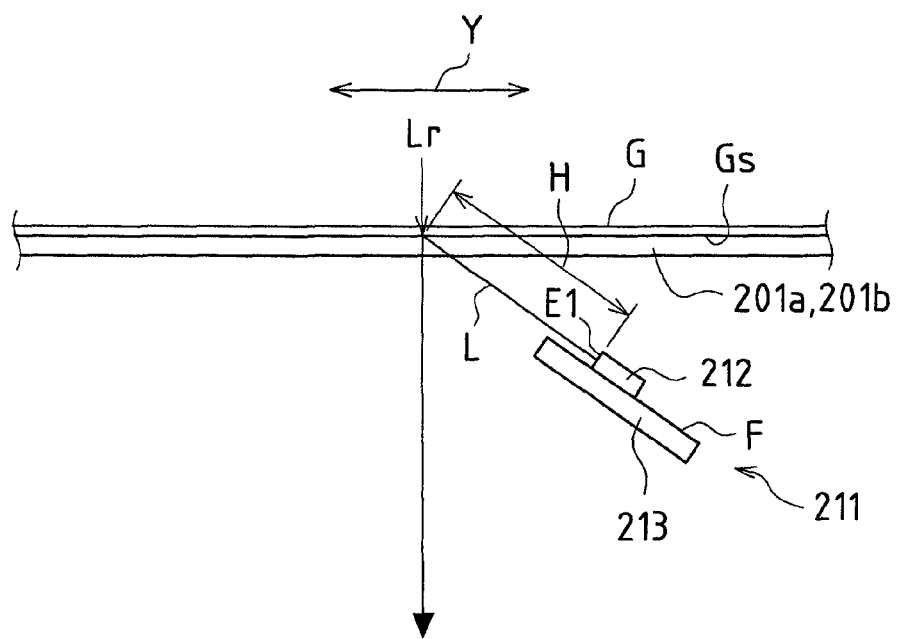
FIG. 6 is a schematic side view that illustrates an example in which a plurality of light-emitting elements are arrayed only on one side in a sub-scanning direction with respect to a light-irradiated region.

FIG. 6 is a schematic side view that illustrates an example in which the plurality of light-emitting elements 212 are arrayed only on one side in the sub-scanning direction Y with respect to the light-irradiated region Lr.

The plurality of light-emitting elements 212 shown in FIG. 6 are mounted on a light source substrate 213 disposed on one side in the sub-scanning direction Y with respect to the light-irradiated region Lr, and each includes an emission face E1 for performing side light emission in which light is emitted such that the optical axis L is parallel to the substrate face F.

Specifically, the light source substrate 213 is disposed inclined such that the optical axis L is directed to the light-irradiated region Lr.

Also, the plurality of light-emitting elements 212 may perform top-face light emission, in which light is emitted such that the optical axis L is orthogonal to the substrate face F of the light source substrate 213 on which the light-emitting elements 212 are mounted, regardless of whether the light-emitting elements 212 are arrayed on both sides or only on one side.

FIG. 7 are schematic side views each illustrating an example of the plurality of light-emitting elements 212 each having an emission face E2 for performing top-face light emission, and FIG. 7(a) is a diagram illustrating an example in which the first light-emitting elements 212a and the second light-emitting elements 212b disposed on both sides perform top-face light emission, and FIG. 7(b) is a diagram illustrating an example in which the light-emitting elements 212 disposed only on one side perform top-face light emission.

As shown in FIG. 7(a), in the case where the first light-emitting elements 212a and the second light-emitting elements 212b each include the emission face E2 for performing top-face light emission, the first light source substrate 213a and the second light source substrate 213b can be arranged in a shape that widens toward the original in which the distance between the substrates increases with decreasing distance to the original, such that the optical axis L is directed to the light-irradiated region Lr. Note that the light-irradiated region Lr is located in the middle between the first light source substrate 213a and the second light source substrate 213b.

Also, as shown in FIG. 7(b), in the case where the light-emitting elements 212 are arrayed only on one side, the light source substrate 213 can be disposed inclined such that the optical axis L is directed to the light-irradiated region Lr.

In this manner, the light-emitting elements may have arrangement configurations shown in FIG. 4 to FIG. 7. In the case where the light-emitting elements are arrayed in the same pitch position configuration as shown in FIG. 4, compared with the configurations shown in FIGS. 6 and 7(b) in which the light-emitting elements are arrayed only on one side, it is possible to double the number of the light-emitting elements, thereby doubling the illuminance. Also, in the case where the light-emitting elements are arrayed in a zigzag manner as shown in FIG. 5, compared with the case in which the light-emitting elements are arrayed in the same pitch position configuration as shown in FIG. 4, it is possible to reduce the illuminance by half, thereby reducing the number of the light-emitting elements by half.

In any case, if the light-emitting elements have the emission faces E1 for performing side light emission or emission faces E2 for performing top-face light emission, by using light-emitting elements having the emission face E1 for performing side light emission and light-emitting elements having the emission face E2 for performing top-face light emission according to the arrangement configuration of elements of the corresponding light source unit 210, it is possible to efficiently use an unused space in the light source unit 210.

In the present embodiment, the first light-emitting elements 212a and the second light-emitting elements 212b are both light-emitting diodes (LEDs). Accordingly, the first light-emitting elements 212a and the second light-emitting elements 212b have strong directivity characteristics in a predetermined direction. The optical axis L corresponds to the direction in which the flux of light emitted from the first light-emitting elements 212a and the second light-emitting elements 212b is strongest.

As shown in FIG. 3, the light source unit 210 includes a light-emitting element array unit 215 and a mirror base unit 216 in which the light-emitting element array unit 215 is provided.

The light-emitting element array unit 215 includes the first light-emitting elements 212a, the first light source substrate 213a on which the first light-emitting elements 212a are disposed, the second light-emitting elements 212b, the second light source substrate 213b on which the second light-emitting elements 212b are disposed, and a substrate base 214 on which the first light source substrate 213a and the second light source substrate 213b are disposed.

Specifically, the first light source substrate 213a and the second light source substrate 213b are fixed to substrate base 214 with fixing members SC such as screws at both ends in the main scanning direction X, while providing a predetermined interval between the first light source substrate 213a and the second light source substrate 213b. In this manner, the first light-emitting elements 212a and the second light-emitting elements 212b are respectively disposed on both sides in the sub-scanning direction Y with respect to the light-irradiated region Lr.

A slit R that extends in the main scanning direction X and causes light reflected from the original G to pass between the first light source substrate 213a and the second light source substrate 213b is formed in the substrate base 214. The slit R is located below the light-irradiated region Lr serving as the original reading position.

The mirror base unit 216 includes the first mirror 230. Specifically, the first mirror 230 is supported inserted in an opening 216a of the mirror base unit 216, the opening 216a extending in the main scanning direction X, such that the light reflected on the light-irradiated face Gs of the original G is guided to the second mirror 203a in the mirror unit 203 via the slit R provided in the substrate base 214.

Incidentally, the first light-emitting elements 212a and the second light-emitting elements 212b are LED elements here, and thus have strong directivity characteristics in a predetermined direction. Accordingly, an uneven illuminance corresponding to the light-emitting element pitch P (hereinafter referred to as an "LED pitch P") may occur on the light-irradiated face Gs of the original G.

Figure 8:
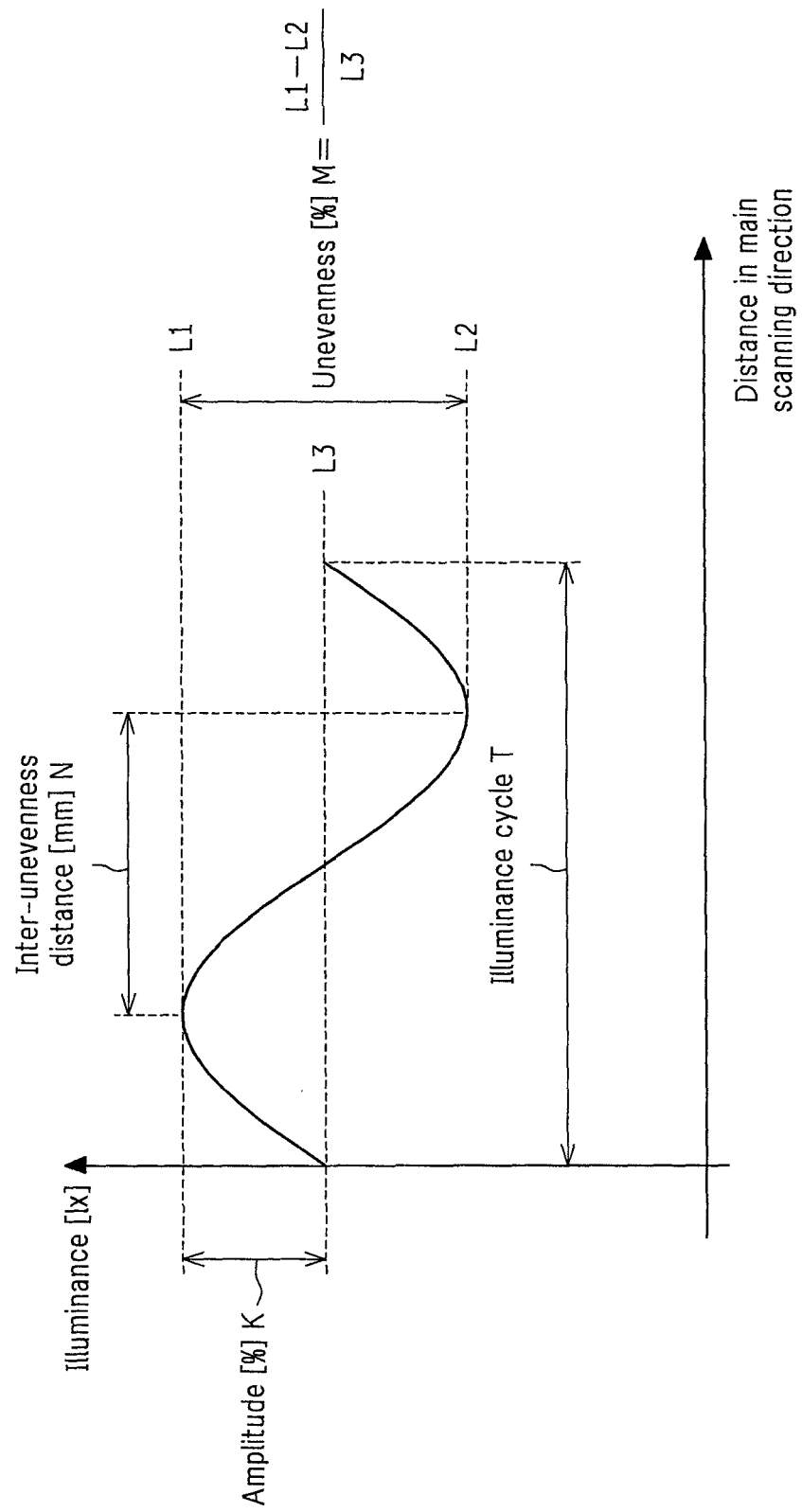
FIG. 8 is a diagram illustrating unevenness [%] M and inter-unevenness distance [mm] N on a light-irradiated face of an original caused by the first light-emitting elements and the second light-emitting elements, and illustrates repetition of bright and dark areas in an illuminance cycle in a main scanning direction.

FIG. 8 is a diagram illustrating the unevenness [%] M and the inter-unevenness distance [mm] N on the light-irradiated face Gs of the original G caused by the first light-emitting elements 212*a* and the second light-emitting elements 212*b*, and illustrates the repetition of bright and dark areas in an illuminance cycle T in the main scanning direction X.

In the illuminance cycle T, the unevenness [%] M is obtained by dividing the value obtained by subtracting a minimum illuminance value L2 [lx (lux)] from a maximum illuminance value L1 [lx] by an average (median) illuminance value L3 [lx] ((L1−L2)/L3 [%]), and the inter-unevenness distance [mm] N corresponds to a half cycle of the illuminance cycle T, that is T/2. Note that when the amplitude [%] is indicated by K, the amplitude [%] K is obtained by dividing the value obtained by subtracting the average illuminance value L3 [lx] from the maximum illuminance value L1 [lx] by the average illuminance value L3 [lx] ((L1−L3)/L3 [%]).

Then, the LED pitch P [mm] and the optical axis distance H [mm], which is the distance on the optical axis L from the light-emitting element to the light-irradiated region Lr of the original G, are set so as to satisfy the relation M≤N/2−5.5, more preferably, M≤N/2−7.5.

Next, the uneven illuminance evaluation performed for obtaining these relations will be described below.

Evaluation of Uneven Illuminance

In the evaluation of the uneven illuminance, 19 patterns of images were created by varying the values of the illuminance cycle T and the amplitude [%] K based on the sine curve shown in FIG. 8. The images were created by a personal computer, and printed with a printer. The color tone of the printed image was set to gray.

Various printed images created as above were checked visually by a large number of test subjects, and an evaluation was made as to whether the uneven density (uneven density corresponding to uneven illuminance) on the printed image is acceptable. The results are shown in FIGS. 9 and 10.

FIG. 9 is a chart showing the illuminance cycle T, the amplitude [%] K, the inter-unevenness distance [mm] N and the unevenness [%] M calculated from these values, and evaluation results of the printed image. FIG. 10 is a graph prepared based on the values in FIG. 9, in which the vertical axis marks the unevenness [%] M and the horizontal axis marks the inter-unevenness distance [mm] N.

Figure 10:
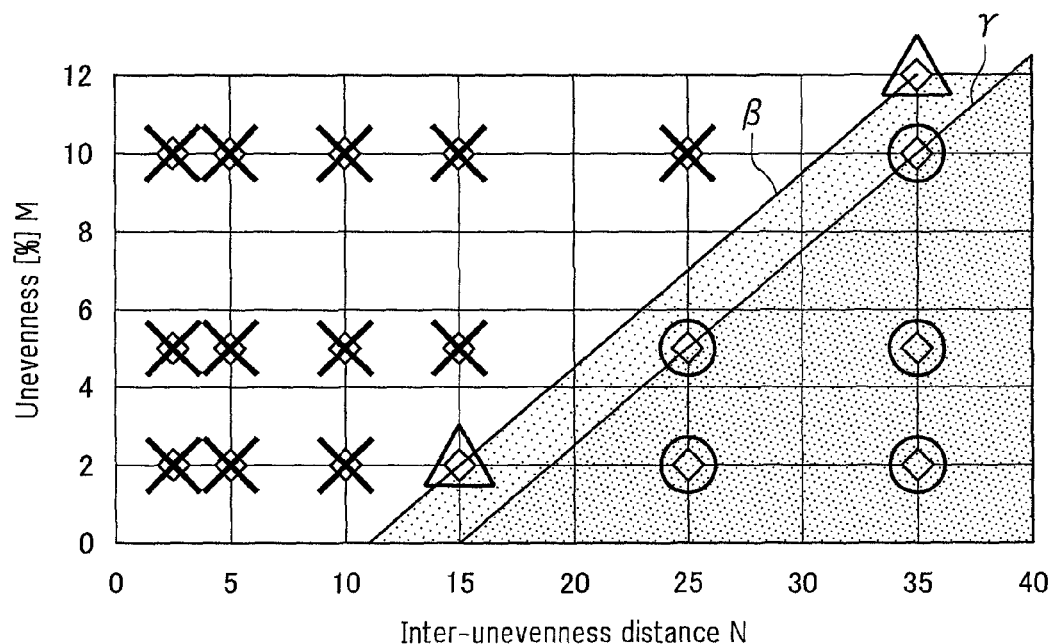
FIG. 10 is a graph prepared based on the values in FIG. 9, in which the vertical axis marks the unevenness [%] M and the horizontal axis marks the inter-unevenness distance [mm] N.

Note that in the evaluation column in FIG. 9 and the graph in FIG. 10, "◯" means "uneven density (uneven illuminance) is sufficiently acceptable", "Δ" means "uneven density (uneven illuminance) is at the acceptable limit", and "×" means "uneven density (uneven illuminance) is not acceptable".

As shown in FIG. 10, the evaluation that the uneven density (uneven illuminance) is not acceptable (evaluated as "×") was made in the range of N/2−5.5 (see β in FIG. 10)<M, the evaluation that uneven density (uneven illuminance) is at the acceptable limit (evaluated as "Δ") was made in the range of N/2−7.5 (see γ in FIG. 10)<M≤N/2−5.5 (see light dotted portion in FIG. 10), and the evaluation that uneven density (uneven illuminance) is sufficiently acceptable (evaluated as "◯") was made in the range of M≤N/2−7.5 (see dark dotted portion in FIG. 10).

Accordingly, by setting the LED pitch P and the optical axis distance H to satisfy the relation N/2−7.5<M≤N/2−5.5, it is possible to suppress the uneven illuminance on the light-irradiated face Gs of the original G to an acceptable level, and by setting the LED pitch P and the optical axis distance H to satisfy the relation M≤N/2−7.5, the uneven illuminance on the light-irradiated face Gs of the original G can be effectively prevented, and also versatile use is possible.

In this state, an optimal relationship can be achieved between the light-emitting element pitch P and the optical axis distance H such that light from the light-emitting elements is efficiently irradiated onto the light-irradiated face Gs of the original G. For example, the light-emitting element pitch P can be set to a value which achieves the smallest possible number of the light-emitting elements with respect to the optical axis distance H, or the optical axis distance H can be set to a value which achieves the highest possible illuminance on the light-irradiated face Gs of the original G with respect to the light-emitting element pitch P.

Next, an analysis simulation in which the unevenness [%] M and the inter-unevenness distance [mm] N are analyzed to specify the range of the (LED pitch P)/(optical axis distance H) will be described.

Analysis Simulation

In an analysis simulation, a virtual image-reading apparatus was realized on a computer using an analysis simulation software (Light Tools manufactured by Optical Research Associates), and the unevenness [%] M and the inter-unevenness distance [mm] N were analyzed while varying the values of the LED pitch P (4 mm to 24 mm) and the optical axis distance H (4 mm to 19 mm). An evaluation was made for the value of P/H based on the evaluation criteria shown in FIG. 10 with respect to the unevenness [%] M and the inter-unevenness distance [mm] N thus analyzed.

Note that when several example values of the LED pitch P and the optical axis distance H used in the analysis simulation were set in a real image-reading apparatus for verification, the unevenness [%] M and the inter-unevenness distance [mm] N obtained with the real image-reading apparatus were almost the same as those obtained in the analysis simulation. Based on this, it was confirmed that the virtual image-reading apparatus realized on the computer using the analysis simulation software is almost equivalent to the real image-reading apparatus.

Figure 11:
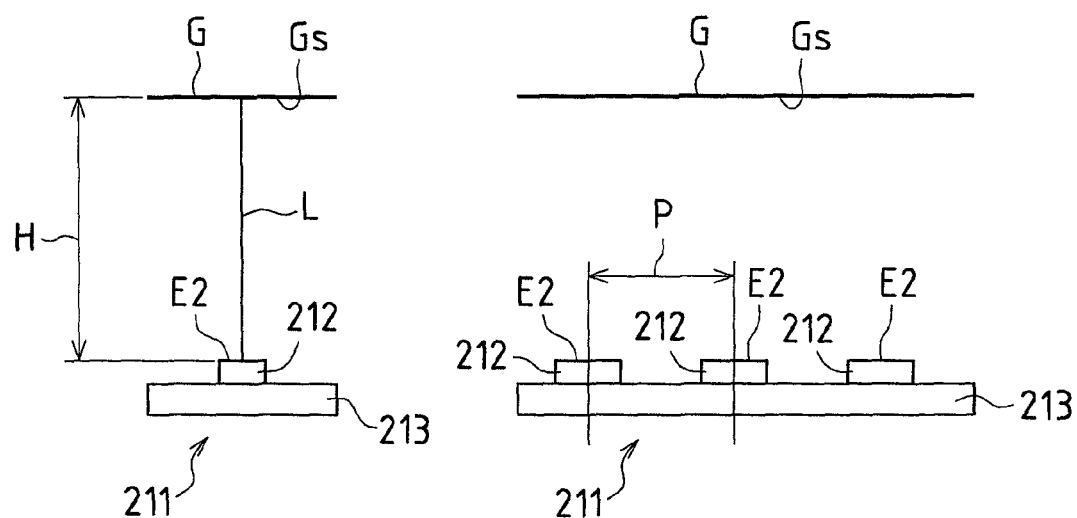
FIG. 11 is a diagram illustrating the conditions of an analysis simulation.

FIG. 11 is a diagram illustrating the conditions of the analysis simulation. In the analysis simulation, as shown in FIG. 11, a light source 211 was configured such that 20 LED elements 212, each including an emission face E2 that performs top-face light emission, are arranged in a line, and are disposed such that their optical axis L is orthogonal to a light-irradiated face Gs of an original G. Also, the light flux of a single LED element 212 (one LED element 212) was set to 7.81 [lm (lumen)] (a luminosity of 1900 [mcd (milicandela)]).

Figure 13:
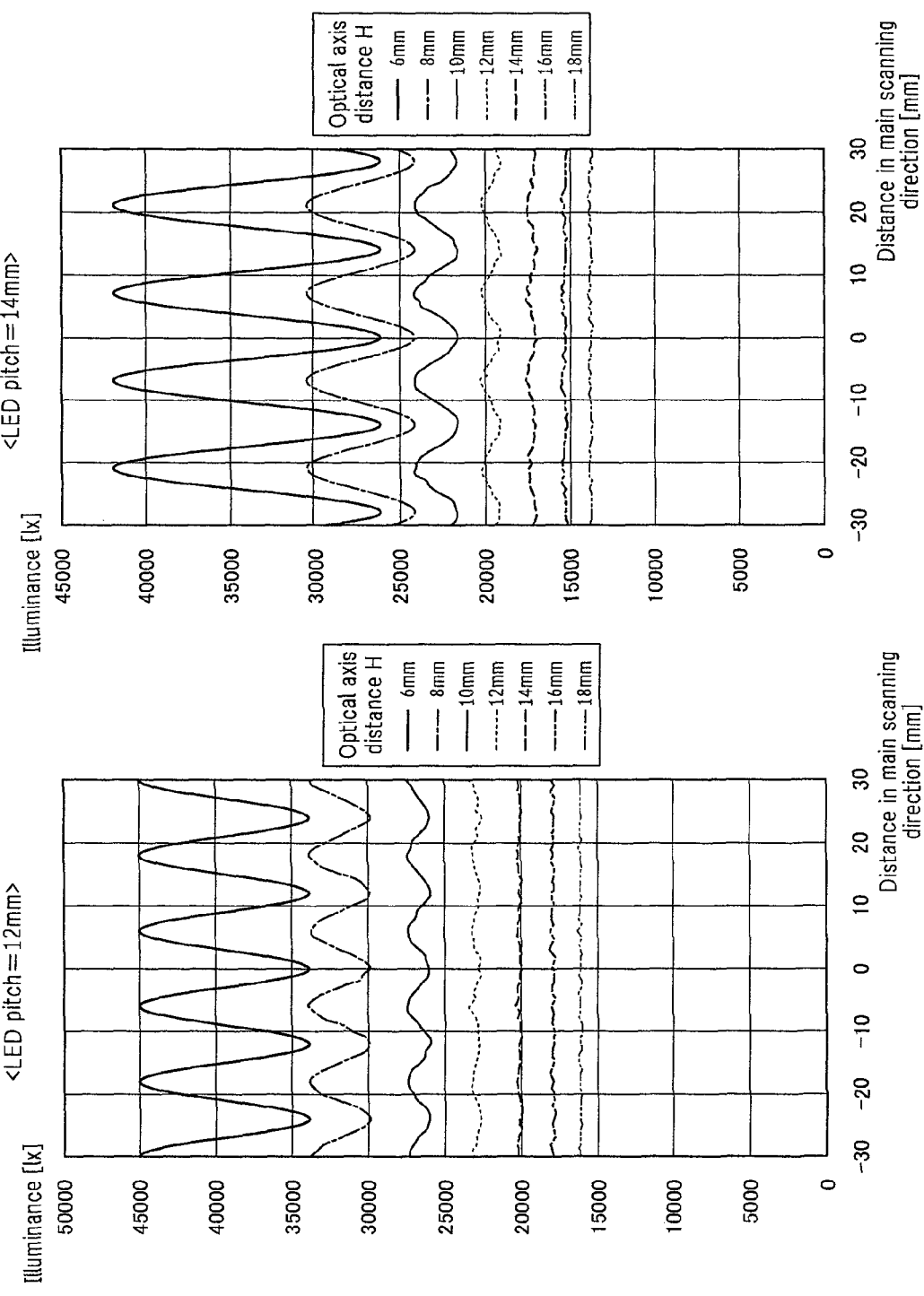
FIG. 13 shows graphs each illustrating, at one of the LED pitch values employed in the analysis simulation, the illuminance [lx] on the light-irradiated face of the original with respect to the distance in the main scanning direction [mm] at several values of the optical axis distance.
Figure 14:
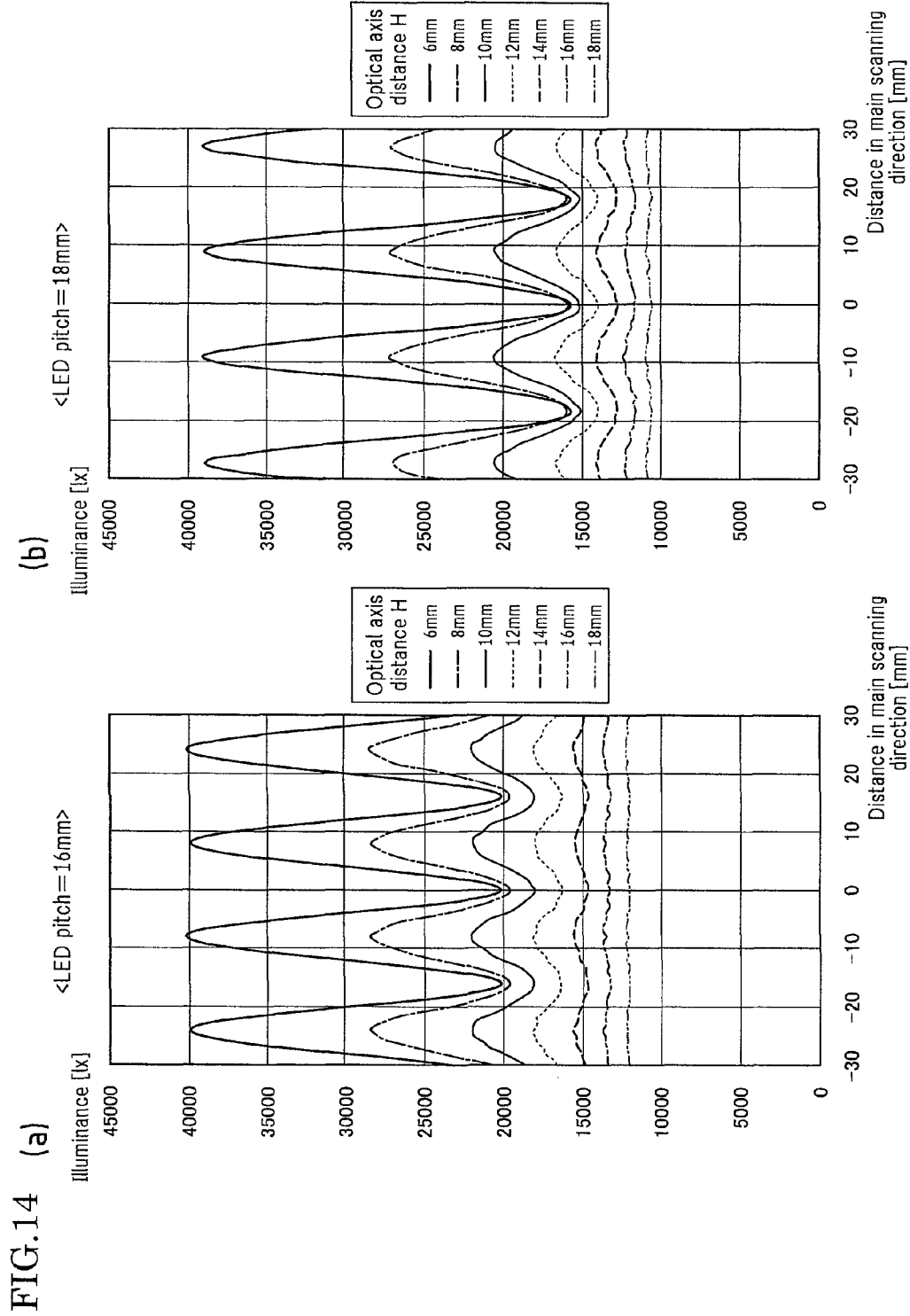
FIG. 14 shows graphs each illustrating, at one of the LED pitch values employed in the analysis simulation, the illuminance [lx] on the light-irradiated face of the original with respect to the distance in the main scanning direction [mm] at several values of the optical axis distance.

FIGS. 12 to 14 show graphs, each illustrating, at one of the LED pitch values employed in the analysis simulation, the illuminance [lx] on the light-irradiated face Gs of the original G with respect to the distance in the main scanning direction [mm] for several values of the optical axis distance H. FIGS. 12(*a*) and 12(*b*) show graphs for the LED pitch P of 8 mm and 10 mm, respectively. FIGS. 13(*a*) and 13(*b*) show graphs for the LED pitch P of 12 mm and 14 mm, respectively, and FIGS. 14(*a*) and 14(*b*) show graphs for the LED pitch P of 16 mm and 18 mm, respectively. In each graph of FIGS. 12 to 14, the optical axis distance H is set to 6 mm, 8 mm, 10 mm, 12 mm, 14 mm, 16 mm and 18 mm as examples. Graphs of other optical axis distances H are not shown.

Among the graphs, the graph in FIG. 14(*a*) with the LED pitch P set to 16 mm is used to describe below an example of automatically evaluating the uneven illuminance when the optical axis distance H is 6 mm.

Figure 15:
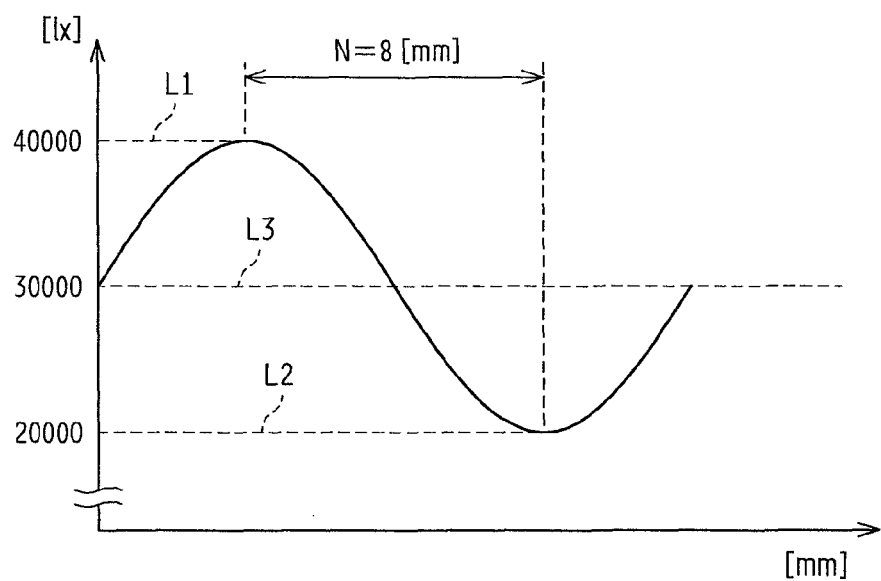
FIG. 15 is a diagram illustrating unevenness [%] M when light-emitting elements having a single-array configuration is used, with the LED pitch set to 16 mm and the optical axis distance set to 6 mm.

FIG. 15 is a diagram illustrating the unevenness [%] M in the case where the LED pitch P is 16 mm, the optical axis distance H is 6 mm and light-emitting elements having the single-line configuration are used.

In the case where the LED pitch P is 16 mm and the optical axis distance H is 6 mm, it is understood from the graph in FIG. 15 that the maximum value L1 of the illuminance on the light-irradiated face Gs of the original G is 40000 [lx], the minimum value L2 is 20000 [lx], and the average value L3 is 30000 [lx]. When these values are inserted into the expression for obtaining the unevenness [%] M, (L1–L2)/L3 described in FIG. 8, the unevenness [%] M is calculated to be 66.7 [%]. Also, since the LED pitch P is 16 mm, the inter-unevenness distance [mm] N is 8 mm.

When the unevenness [%] M =66.7 [%] and the inter-unevenness distance [mm] N =8 mm obtained in this manner are applied to the graph showing the relation between the unevenness [%] M and the inter-unevenness distance [mm] N as shown in FIG. 10, such values fall within the range of N/2−5.5 (see B in FIG. 10)<M. As a result, P/H (16 mm/6 mm=2.67) is determined to be an unacceptable uneven illuminance (evaluated as "x"). The tables in FIGS. 16 and 17 show the results of the evaluation similarly performed on other values of the LED pitch P and the optical axis distance H as well.

FIG. 16 shows the evaluation results of P/H in the case where the LED pitch P is varied from 4 mm to 11 mm in increments of 1 mm, and the optical axis distance H is varied from 4 mm to 24 mm in increments of 1 mm.

FIG. 17 shows the evaluation results of P/H in the case where the LED pitch P is varied from 12 mm to 19 mm in increments of 1 mm, and the optical axis distance H is varied from 4 mm to 24 mm in increments of 1 mm.

As shown in FIGS. 16 and 17, when the relation P/H>0.83 is satisfied, it is determined that the uneven illuminance is not acceptable (evaluated as "x"), when the relation 0.71<P/H≤0.83 is satisfied, it is determined that the uneven illuminance is at the acceptable limit (evaluated as "A"), and when the relation P/H≤0.71 is satisfied, it is determined that the uneven illuminance is sufficiently acceptable (evaluated as "o").

Based on the above, it is understood that uneven illuminance can be suppressed if the light-emitting element pitch P and the optical axis distance H satisfy the relation P/H≤0.83. Thus, when the value of one of the light-emitting element pitch P and the optical axis distance H is known, the other can be easily set by setting the other such that the relation M≤N/2−5.5 is satisfied, since it is sufficient to insert the light-emitting element pitch P or the optical axis distance H into the relational expression P/H≤0.83 when setting the light-emitting element pitch P and the optical axis distance H. For example, when the optical axis distance H is obtained by inserting the light-emitting element pitch P into the relational expression, it is sufficient to set the optical axis distance H to the value of (P/0.83) or a value not less than and as close as possible to the value of (P/0.83), from the viewpoint of setting the largest possible illuminance on the light-irradiated face Gs of the original G. On the other hand, when the light-emitting element pitch P is obtained by inserting the optical axis distance H into the relational expression, it is sufficient to set the light-emitting element pitch P to the value of (H×0.83) or a value not more than and as close as possible to the value of (H×0.83), from the viewpoint of setting the smallest possible number of light-emitting elements.

In addition, it is understood that uneven illuminance can be effectively prevented if the light-emitting element pitch P and the optical axis distance H satisfy the relation P/H≤0.71. Thus, when the value of one of the light-emitting element pitch P and the optical axis distance H is known, the other can be easily set by setting the other such that the relation M≤N/2−7.5 is satisfied, since it is sufficient to insert the light-emitting element pitch P or the optical axis distance H into the relational expression P/H≤0.71 when setting the light-emitting element pitch P and the optical axis distance H. For example, when the optical axis distance H is obtained by inserting the light-emitting element pitch P into the relational expression, it is sufficient to set the optical axis distance H to the value of (P/0.71) or a value not less than and as close as possible to the value of (P/0.71), from the viewpoint of setting the largest possible illuminance on the light-irradiated face Gs of the original G. On the other hand, when the light-emitting element pitch P is obtained by inserting the optical axis distance H into the relational expression, it is sufficient to set the light-emitting element pitch P to the value of (H×0.71) or a value not more than and as close as possible to the value of (H×0.71), from the viewpoint of setting the smallest possible number of light-emitting elements.

Note that although light-emitting elements having the single-line configuration as shown in FIG. 11 are employed in the analysis simulation described above, any arrangement configuration of the light-emitting elements may be employed for the analysis simulation if such an arrangement configuration may generate the unevenness [%] M and the inter-unevenness distance [mm] N.

Also, even if analysis simulation is performed using the light-emitting elements having the same pitch position configuration as shown in FIG. 4 (the configuration achieving double illuminance compared with the single-line configuration), similar simulation results are obtained.

Figure 18:
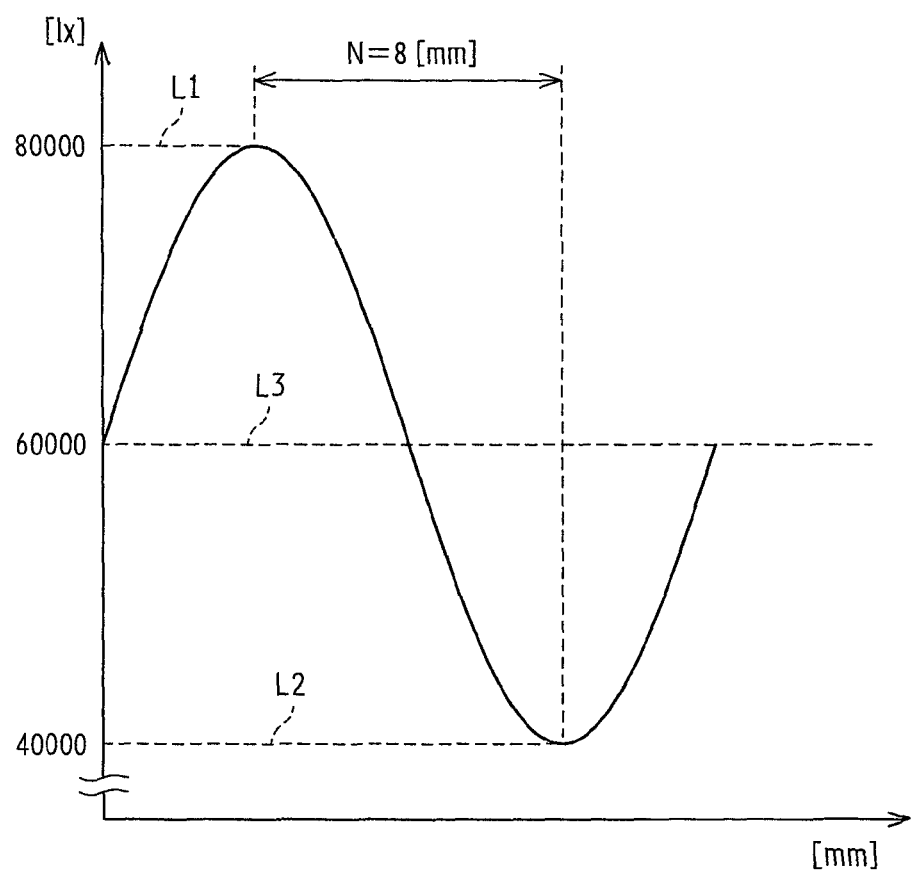
FIG. 18 is a diagram illustrating unevenness [%] M of the case where light-emitting elements having a same pitch position configuration as shown in FIG. 4 (configuration that achieves a double illuminance compared with the single-line configuration) are used, under the condition of FIG. 15 in which the LED pitch is set to 16 mm and the optical axis distance is set to 6 mm.

FIG. 18 is a diagram illustrating the unevenness [%] M in the case where the light-emitting elements having the same pitch position configuration shown in FIG. 4 (the configuration achieving double illuminance compared with the single-line configuration) are used under the condition of FIG. 15 in which the LED pitch P is 16 mm, and the optical axis distance H is 6 mm.

As shown in FIG. 18, with the light-emitting elements having the same pitch position configuration, the maximum value L1 of the illuminance on the light-irradiated face Gs of the original G is 80000 [lx], the minimum value L2 is 40000 [lx], and the average value L3 is 60000 [lx]. When these values are inserted into the expression for obtaining the unevenness [%] M described in FIG. 8, (L1–L2)/L3, the unevenness [%] M is calculated to be 66.7 [%].

In this manner, even if the light-emitting elements having the same pitch position configuration shown in FIG. 4 are used, unevenness [%] M similar to that obtained by using the light-emitting elements having the single-line configuration shown in FIG. 15 is obtained. Consequently, also when the analysis simulation is performed by using light-emitting elements having the same pitch position configuration as shown in FIG. 4 (the configuration achieving double illuminance compared with the single-line configuration), unevenness [%] M similar to that obtained by using the light-emitting elements having the single-line configuration is obtained.

Also, in the analysis simulation, while the light flux of a single LED element 212 (one LED) is set to 7.81 [lm] (a luminosity of 1900 [mcd]), even if the light flux of a single LED was set to a larger or smaller value, the same unevenness [%] M is obtained due to the same reasons as described above.

In other words, regardless of the arrangement configuration or the light amount of the light-emitting elements, if the relation P/H≤0.83 is satisfied, uneven illuminance can be suppressed to a degree acceptable for practical use. Furthermore, if the relation P/H≤0.71 is satisfied, uneven illuminance can be effectively prevented.

In the image reading apparatus 100 shown in FIGS. 1 and 2, the light source 211 can directly irradiate the original G via the platen glasses 201a and 201b. Accordingly, since it is possible to suppress uneven illuminance without providing a diffusion member provided in conventional illuminating apparatuses between the original and the light source, manufacturing cost does not increase and loss in the light amount when light from the light source 211 is irradiated onto the original G can be prevented. Therefore, for example, it is possible to apply the illuminating apparatus of the present invention to image reading apparatuses whose speed for reading the original G is comparatively fast, without increasing the light amount of the light-emitting elements.

The present invention may be embodied in various other forms without departing from the gist or essential characteristics thereof. Therefore, the embodiments disclosed in this application are to be considered in all respects as illustrative and not limiting. The scope of the invention is indicated by the appended claims rather than by the foregoing description. All modifications or changes that come within the meaning and range of equivalency of the claims are intended to be embraced therein.

This application claims priority on Japanese Patent Application No. 2009-011064 filed in Japan on Jan. 21, 2009, the entire content of which is incorporated herein by reference. Furthermore, the entire contents of references cited in the present specification are herein specifically incorporated by reference.

Description of Reference Numerals
100 Image reading apparatus
201a Platen glass (example of original stage)
201b Original reading glass (another example of original stage)
210 Light source unit (example of illuminating apparatus)
211 Light source
212 Light-emitting elements
212a First light-emitting elements
212b Second light-emitting elements
D Image forming apparatus
E1 Emission face for performing side light emission
E2 Emission face for performing top-face light emission
G Original
Gs Light-irradiated face of original
H Optical axis distance
L Optical axis
L1 Maximum illuminance value
L2 Minimum illuminance value
L3 Average illuminance value
Lr Light-irradiated region
M Unevenness [%]
N Inter-unevenness distance [mm]
P Light-emitting element pitch
T Illuminance cycle
X Main scanning direction (example of first direction)
Y Sub-scanning direction (example of second direction)

The invention claimed is:

1. An illuminating apparatus comprising a light source in which a plurality of light-emitting elements are arrayed, each light-emitting element irradiating light toward a light-irradiated region onto an original, the light-irradiated region extending in a predetermined first direction,
wherein, when P is a light-emitting element pitch [mm] in the first direction of the plurality of light-emitting elements, and H is an optical axis distance [mm] between the plurality of light-emitting elements and the original, and
when, in an illuminance cycle representing repetition of bright and dark areas in the first direction on a light-irradiated face of the original caused by the plurality of light-emitting elements, M is an unevenness [%] (=(L1−L2)/L3)[%]) obtained by dividing a value, obtained by subtracting a minimum illuminance value (L2) from a maximum illuminance value (L1), by an average illuminance value (L3), and N is an inter-unevenness distance [mm] which is a half cycle of the illuminance cycle,
the unevenness [%] (M) and the inter-unevenness distance [mm] (N) satisfy the relation M ≤N/2− 5.5, and the light-emitting element pitch (P) and the optical axis distance (H) satisfy the relation P/H≤0.83.

2. The illuminating apparatus according to claim 1, wherein the light-emitting element pitch (P) and the optical axis distance (H) are set such that the unevenness [%] (M) and the inter-unevenness distance [mm] (N) satisfy the relation M≤N/2−7.5.

3. The illuminating apparatus according to claim 2, wherein the light-emitting element pitch (P) and the optical axis distance (H) satisfy the relation P/H≤0.71.

4. The illuminating apparatus according to claim 1, wherein the plurality of light-emitting elements are arrayed only on one side of the light-irradiated region, in a second direction that is orthogonal to the first direction and along the light-irradiated face.

5. The illuminating apparatus according to claim 1, wherein the plurality of light-emitting elements are arrayed on both sides of the light-irradiated region, in a second direction that is orthogonal to the first direction and along the light-irradiated face.

6. The illuminating apparatus according to claim 5, wherein the plurality of light-emitting elements include a plurality of first light-emitting elements arrayed in the first direction on one of the two sides, and a plurality of second light-emitting elements arrayed in the first direction on the other side, and
the first light-emitting elements and the second light-emitting elements are arrayed such that a pitch between the plurality of first light-emitting elements and a pitch between the plurality of second light-emitting elements are the same distance as the light-emitting element pitch (P), and the pitch positions thereof match in the second direction.

7. The illuminating apparatus according to claim 5, wherein the plurality of light-emitting elements include a plurality of first light-emitting elements arrayed in the first direction on one of the two sides, and a plurality of second light-emitting elements arrayed in the first direction on the other side, and
the first light-emitting elements and the second light-emitting elements are arrayed such that a pitch between the plurality of first light-emitting elements and a pitch between the plurality of second light-emitting elements are a distance that is double the light-emitting element pitch (P), and the pitch positions thereof are staggered by a half the pitch in the first direction.

8. The illuminating apparatus according to claim 1, wherein the plurality of light-emitting elements are mounted on a light source substrate, and each include an emission face for performing one of side light emission in which light is emitted such that an optical axis is parallel to a substrate face of the light source substrate and top-face light emission in which light is emitted such that the optical axis is orthogonal to the substrate face of the light source substrate.

9. An image reading apparatus comprising the illuminating apparatus according to claim 1.

10. The image reading apparatus according to claim 9, wherein the image reading apparatus comprises a light-transmitting original stage, and the light source directly irradiates the original via the original stage.

11. An image forming apparatus comprising the image reading apparatus according to claim 10.

12. An image forming apparatus comprising the image reading apparatus according to claim 9.

* * * * *